US009462341B2

(12) United States Patent
Davis et al.

(10) Patent No.: US 9,462,341 B2
(45) Date of Patent: *Oct. 4, 2016

(54) SECOND SCREEN METHODS AND ARRANGEMENTS

(71) Applicant: Digimarc Corporation, Beaverton, OR (US)

(72) Inventors: Bruce L. Davis, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/193,935

(22) Filed: Feb. 28, 2014

(65) Prior Publication Data

US 2014/0282735 A1  Sep. 18, 2014

Related U.S. Application Data

(63) Continuation of application No. 13/971,575, filed on Aug. 20, 2013, which is a continuation of application No. 13/733,679, filed on Jan. 3, 2013, now Pat. No. 8,516,533, which is a continuation-in-part of (Continued)

(51) Int. Cl.
*H04N 21/462* (2011.01)
*H04N 21/482* (2011.01)
(Continued)

(52) U.S. Cl.
CPC .......... *H04N 21/4622* (2013.01); *H04H 60/27* (2013.01); *H04H 60/33* (2013.01);
(Continued)

(58) Field of Classification Search
None
See application file for complete search history.

(56) References Cited

U.S. PATENT DOCUMENTS 6,522,769 B1  2/2003  Davis
6,829,368 B2  12/2004  Meyer
(Continued)

FOREIGN PATENT DOCUMENTS

| JP | 2002112238 A2 | 4/2002 |
| JP | 2003209822 A2 | 7/2003 |
| WO | 2010093510 A1 | 8/2010 |

OTHER PUBLICATIONS

Prosecution excerpts from Chinese patent application 201080015678.7 (corresponding to WO2010093510), including actions dated Jul. 30, 2013, Jun. 6, 2014, Oct. 21, 2014, and Jul. 21, 2015, and claims submitted in response to first, second and third actions.

(Continued)

*Primary Examiner* — Mark D Featherstone
(74) *Attorney, Agent, or Firm* — Digimarc Corporation

(57) ABSTRACT

The present technology concerns cell phones and similar devices, and their use in conjunction with media content (electronic and physical) and other systems (e.g., televisions, digital video recorders, and electronic program directories). Some aspects of the technology particularly concern "second screen" applications that sense a television program being watched by a user, and present menus of complementary content on the phone touchscreen from which the user can select. This complementary content can include other video content, associated web pages, opportunities to buy merchandise related to the program, etc. This complementary content can be identified by a provider of the television program, or can be identified otherwise (e.g., by crowdsourcing). In some embodiments, the phone instructs a remote DVR to record content of interest for later viewing. The technology also provides features for making TV watching a social experience—involving remote friends. A great number of other arrangements and details are also disclosed.

19 Claims, 15 Drawing Sheets

Related U.S. Application Data application No. 12/271,772, filed on Nov. 14, 2008, and a continuation-in-part of application No. 12/490,980, filed on Jun. 24, 2009.

(60) Provisional application No. 61/112,573, filed on Nov. 7, 2008, provisional application No. 61/167,828, filed on Apr. 8, 2009, provisional application No. 61/160,660, filed on Mar. 16, 2009, provisional application No. 61/152,226, filed on Feb. 12, 2009.

(51) Int. Cl.

| | | |
|---|---|---|
| *H04H 60/27* | (2008.01) | |
| *H04H 60/37* | (2008.01) | |
| *H04H 60/61* | (2008.01) | |
| *H04N 5/765* | (2006.01) | |
| *H04N 7/173* | (2011.01) | |
| *H04N 21/2389* | (2011.01) | |
| *H04N 21/414* | (2011.01) | |
| *H04N 21/4227* | (2011.01) | |
| *H04N 21/433* | (2011.01) | |
| *H04N 21/439* | (2011.01) | |
| *H04N 21/44* | (2011.01) | |
| *H04N 21/8358* | (2011.01) | |
| *H04H 60/33* | (2008.01) | |
| *H04H 60/74* | (2008.01) | |
| *H04H 60/80* | (2008.01) | |
| *H04H 60/85* | (2008.01) | |
| *H04N 21/41* | (2011.01) | |
| *H04N 21/422* | (2011.01) | |
| *H04N 21/431* | (2011.01) | |
| *H04N 5/76* | (2006.01) | |
| *H04N 5/775* | (2006.01) | |
| *H04N 5/913* | (2006.01) | |
| *H04N 9/82* | (2006.01) | |
| *H04N 9/835* | (2006.01) | |

(52) U.S. Cl.
CPC .......... *H04H 60/372* (2013.01); *H04H 60/61* (2013.01); *H04H 60/74* (2013.01); *H04H 60/80* (2013.01); *H04H 60/85* (2013.01); *H04N 5/76* (2013.01); *H04N 5/765* (2013.01); *H04N 5/775* (2013.01); *H04N 5/913* (2013.01); *H04N 7/17318* (2013.01); *H04N 9/8205* (2013.01); *H04N 9/8211* (2013.01); *H04N 9/835* (2013.01); *H04N 21/23892* (2013.01); *H04N 21/4126* (2013.01); *H04N 21/41407* (2013.01); *H04N 21/4227* (2013.01); *H04N 21/42222* (2013.01); *H04N 21/42224* (2013.01); *H04N 21/4312* (2013.01); *H04N 21/4334* (2013.01); *H04N 21/4394* (2013.01); *H04N 21/44008* (2013.01); *H04N 21/482* (2013.01); *H04N 21/8358* (2013.01); *H04N 2005/91335* (2013.01)

(56) References Cited

U.S. PATENT DOCUMENTS

| | | |
|---|---|---|
| 7,302,574 B2 | 11/2007 | Bradley |
| 7,370,343 B1 * | 5/2008 | Ellis ............................ 725/58 |
| 7,461,136 B2 | 12/2008 | Rhoads |
| 7,590,259 B2 | 9/2009 | Levy |
| 8,032,909 B2 | 10/2011 | Davis |
| 8,528,036 B2 | 9/2013 | Davis |
| 2001/0001160 A1 | 5/2001 | Shoff |
| 2003/0051252 A1 | 3/2003 | Shigeyoshi |
| 2003/0154493 A1 | 8/2003 | Ram |
| 2003/0163828 A1 | 8/2003 | Janevski |
| 2004/0073923 A1 | 4/2004 | Wasserman |
| 2005/0108754 A1 | 5/2005 | Carhart |
| 2005/0120391 A1 | 6/2005 | Protus |
| 2005/0210526 A1 * | 9/2005 | Levy .................. H04N 7/17318 725/113 |
| 2006/0218599 A1 | 9/2006 | Tannenbaum |
| 2007/0157246 A1 * | 7/2007 | Phillips .................. G06Q 30/02 725/46 |
| 2007/0180057 A1 | 8/2007 | McEnroe |
| 2008/0034038 A1 | 2/2008 | Van Os |
| 2008/0052783 A1 | 2/2008 | Levy |
| 2008/0091777 A1 | 4/2008 | Carlos |
| 2008/0127281 A1 | 5/2008 | Azera |
| 2008/0139182 A1 | 6/2008 | Levy |
| 2008/0152315 A1 * | 6/2008 | Peters .................... H04N 5/775 386/291 |
| 2008/0228821 A1 * | 9/2008 | Mick ....................... G06F 21/10 |
| 2008/0270449 A1 | 10/2008 | Blackburn |
| 2008/0275906 A1 | 11/2008 | Levy |
| 2009/0119335 A1 | 5/2009 | Ide |
| 2009/0119715 A1 * | 5/2009 | Schwesinger ...... H04N 5/44543 725/58 |
| 2009/0210909 A1 | 8/2009 | Mukerji |
| 2010/0043030 A1 | 2/2010 | White |
| 2011/0099582 A1 | 4/2011 | Raftelis |
| 2012/0030554 A1 * | 2/2012 | Toya ............................ 715/206 |
| 2012/0284105 A1 * | 11/2012 | Li ............................. 705/14.23 |
| 2014/0250480 A1 * | 9/2014 | Koh et al. ..................... 725/110 |

OTHER PUBLICATIONS

Prosecution excerpts from European patent application 10741557.2 (corresponding to WO2010093510), including claims presented for examination on Jun. 10, 2014, action dated Jul. 31, 2014, and response dated Jan. 15, 2015.

Prosecution excerpts from Japanese patent application 2011-550147 (corresponding to WO2010093510), including actions dated Feb. 25, 2014 and Jan. 6, 2015, responses dated Jun. 25, 2014 and Apr. 27, 2015, and granted patent dated Aug. 14, 2015.

* cited by examiner

| AGE | ZIP | LAT/LONG | GENDER | PRIMARY CONTENT | AUXILIARY CONTENT |
|---|---|---|---|---|---|
| 16 | 97034 | | M | Timberwolves v. Blazers, Jan 30, 2009 | http://www.youtube.com/watch?v=OZpljX-jnFk |
| 17 | 97035 | | M | Timberwolves v. Blazers, Jan 30, 2009 | http://www.nba.com/playerfile/kevin_love/index.html |
| 15 | 97035 | 45.415 – 122.723 | F | Timberwolves v. Blazers, Jan 30, 2009 | http://zeta.zappos.com/brand/288/Ugg |
| 15 | 97035 | 45.415 – 122.723 | F | Timberwolves v. Blazers, Jan 30, 2009 | http://www.nike.com/nikeos/p/nikewomen/en_US/training_widget |
| 13 | 07974 | | M | Goldfinger | http://www.sis.gov.uk/output/sis-home-welcome.html |
| 16 | 36532 | | M | Goldfinger | www.astonmartin.com/eng/gallery |
| 70 | 97034 | | | Goldfinger | http://www.thebar.com/default.aspx |

FIG. 4

PROGRAM DIRECTORY DATA

DAILY SHOW WITH JON STEWART, ORIG DATE 6/15/09

Protests erupt as Mahmoud Ahmadinejad wins in a landslide victory over his challenger, Mir Hossein Mousavi. In reaction to the Iranian election results, Joe Biden expresses doubt, Jason Jones heads to a hookah bar, and John Oliver isn't surprised. Samantha Bee shares in the revolutionary spirit of Long Island, and Ed Helms' jacket is too small.

| YOUTUBE | WEB | mNgBf6VQbaY | ISAN 0000-0001-6046-0000-T-0000-0003-0 | 6/15/09, 8:42 pm (on demand) |
|---|---|---|---|---|
| ITUNES | WEB | | | 6/15/09, 9:00 pm (on demand) |
| HULU | WEB | 77973 | | 6/15/09, 9:00 pm (on demand, thru 7/15/09) |
| COMEDY CENTRAL | WEB | | | 6/15/09, 8:00 pm (on demand, thru 7/21/09) |
| COMEDY CENTRAL | TV | | ISAN 0000-0001-6046-0000-T-0000-0001-0 | 6/15/09, 8:00 pm (30min) |
| LIMEWIRE | P2P | | | 6/15/09, 8:47 pm (on demand) |
| TELEMUNDO | TV | | | 6/16/09, 2:36 pm |

| COMEDY CENTRAL | TV | |
|---|---|---|
| DISH NETWORK | | 107 |
| DIRECTTV | | 250 |
| COMCAST | | 55 |

6/15/09, 10:30 pm (30min) | 6/16/09, 7:30 am (30min)

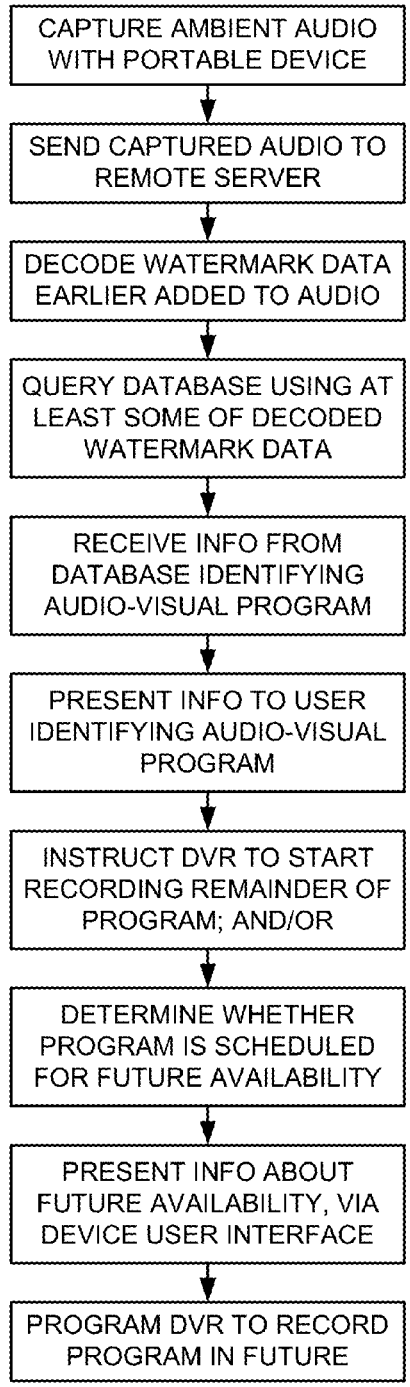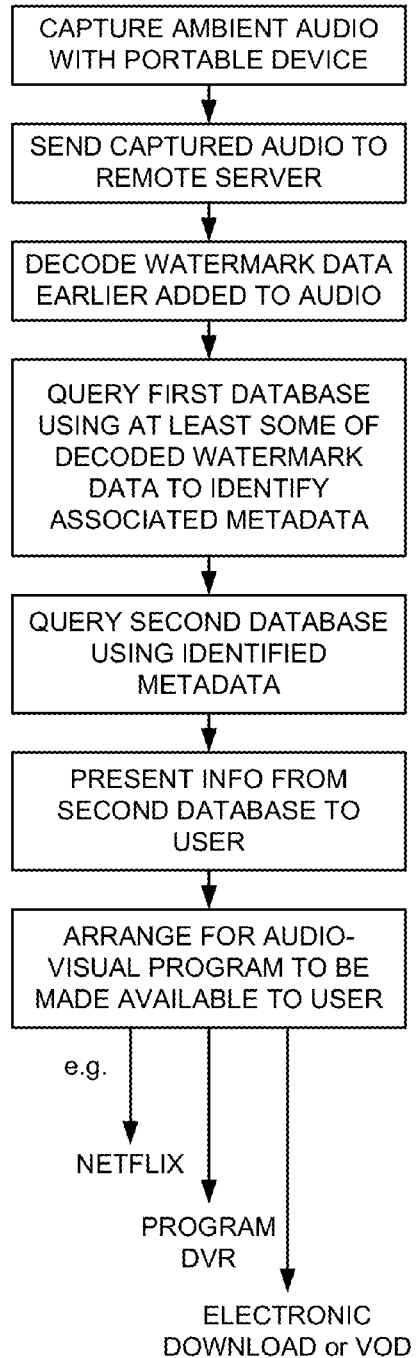
FIG. 10
FIG. 18

| SOURCE CODE | TIME CODE | CONTENT |
|---|---|---|
| 1DA7 | 20081105201812 | SOPRANOS, Episode 42<br>ISAN 0100-57DA-867A-0000-B-0000-0000-H |
| 1DA7 | 20081105201814 | COMMERCIAL: Coca Cola, Yao Ming<br>ISAN 0000-3BAB-9352-0000-G-0000-0000-Q |
| 1DA7 | 20081105201817 | COMMERCIAL: Coca Cola, Yao Ming<br>ISAN 0000-3BAB-9352-0000-G-0000-0000-Q |
| ... | ... | ... |
| 1DA7 | 20081105201915 | SOPRANOS, Episode 42<br>ISAN 0100-57DA-867A-0000-B-0000-0000-H |
| 1DA7 | 20081105201918 | SOPRANOS, Episode 42<br>ISAN 0100-57DA-867A-0000-B-0000-0000-H |
| 1DA7 | 20081105201920 | SOPRANOS, Episode 42<br>ISAN 0100-57DA-867A-0000-B-0000-0000-H |
| ... | ... | ... |
| 1DA7 | 20081005202937 | SOPRANOS, Episode 42<br>ISAN 0100-57DA-867A-0000-B-0000-0000-H |
| 1DA7 | 20081005202939 | <no data> |
| 1DA7 | 20081005202942 | <no data> |

FIG. 11

SEARCH FOR: SOPRANOS 42

| DATE/TIME | CHANNEL | EPISODE AND DESCRIPTION |
| --- | --- | --- |
| 11/5/08<br>8:00 pm | 107 | The Sopranos, "Denial, Anger, Acceptance"<br>Episode 42 |
| 11/6/08<br>1:00 am | 107 | The Sopranos, "Denial, Anger, Acceptance"<br>Episode 42 (Repeat) |
| 11/6/08<br>10:00 am | 107 | The Sopranos, "Denial, Anger, Acceptance"<br>Episode 42 (Repeat) |
| 11/11/08<br>3:00 am | 344 | The Sopranos, "Denial, Anger, Acceptance"<br>Episode 42 (Repeat) |

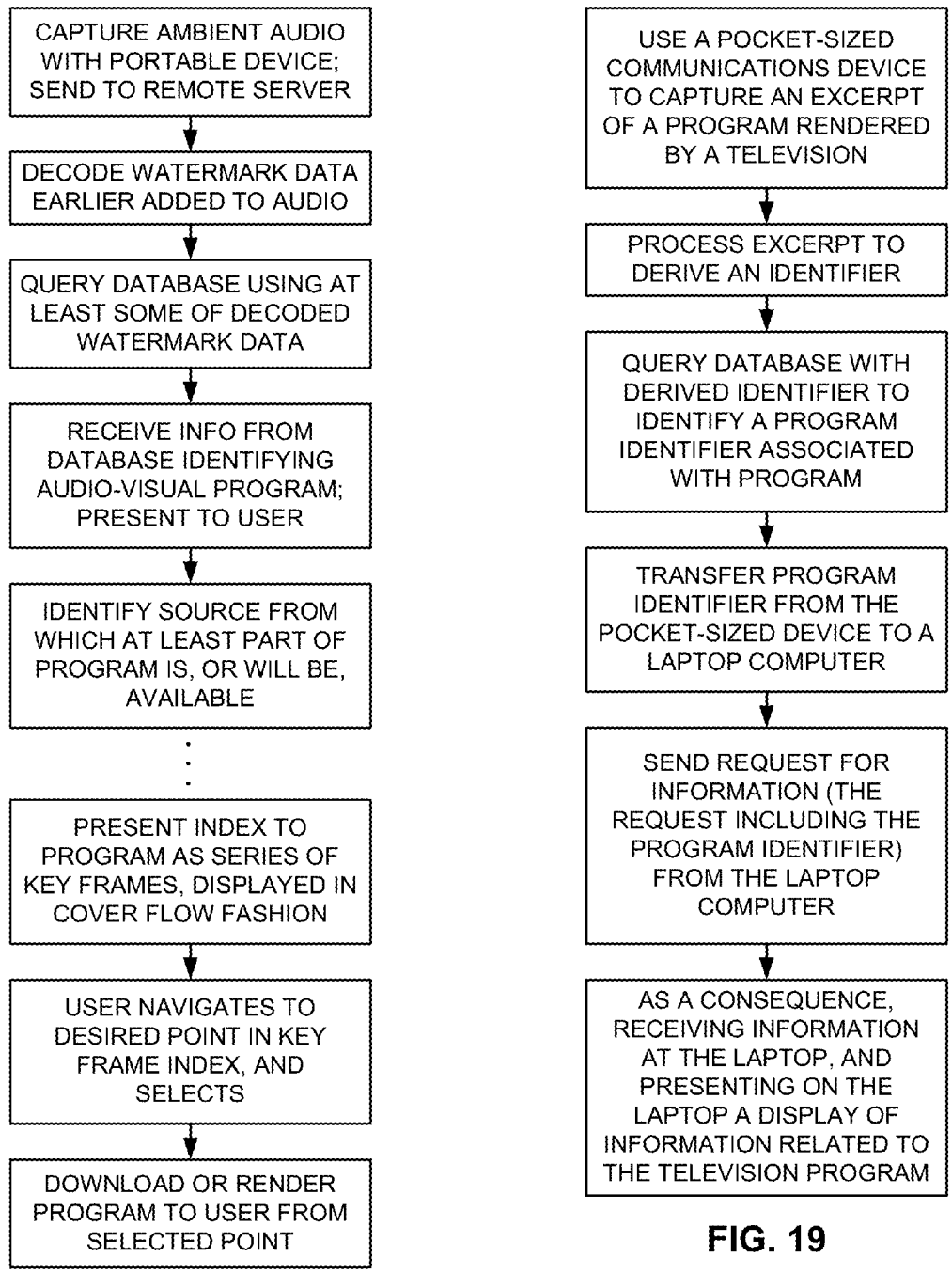

SECOND SCREEN METHODS AND ARRANGEMENTS

RELATED APPLICATION DATA

This application is a continuation of application Ser. No. 13/971,575, filed Aug. 20, 2013, which is a continuation of application Ser. No. 13/733,679, filed Jan. 3, 2013 (now U.S. Pat. No. 8,516,533), which is a continuation-in-part of application Ser. No. 12/271,772, filed Nov. 14, 2008 (published as US20100119208), and Ser. No. 12/490,980, filed Jun. 24, 2009 (published as US20100205628). Application Ser. No. 12/271,772 claims priority to provisional application 61/112,573, filed Nov. 7, 2008. Application Ser. No. 12/490,980 claims priority to provisional applications 61/167,828, filed Apr. 8, 2009, 61/160,660, filed Mar. 16, 2009, and 61/152,226, filed Feb. 12, 2009. These applications are incorporated herein by reference.

TECHNICAL FIELD

The present technology concerns cell phones and other portable devices, and more particularly concerns use of such devices in connection with media content (electronic and physical) and with other systems (e.g., televisions, digital video recorders, and electronic program guides).

INTRODUCTION

The present technology builds on, and extends, technology disclosed in prior patent applications by the present assignee. The reader is thus directed to the following applications (which are incorporated herein by reference) that serve to detail arrangements in which applicants intend the present technology to be applied, and that technically supplement the present disclosure:

Application Ser. No. 12/271,772, filed Nov. 14, 2008 (published as US20100119208), entitled Content Interaction Methods and Systems Employing Portable Devices (presented below, under the heading "Appendix");

Application Ser. No. 61/150,235, filed Feb. 5, 2009, entitled Second Screens and Widgets;

Application Ser. No. 61/157,153, filed Mar. 3, 2009, entitled Narrowcasting from Public Displays, and Related Methods; and Application Ser. No. 12/484,115, filed Jun. 12, 2009 (published as US20100048242), entitled Methods and Systems for Content Processing.

These earlier patent applications detail how a cell phone can watch or listen to the user's environment, and identify content (e.g., media objects or physical objects) from that environment. The cell phone can then be used to help complement the user's experience.

The present disclosure details a great variety of further improvements and new innovations.

For example, in accordance with one aspect of the below-detailed technology, it is not necessary for a cell phone to watch or listen to the user's environment. Guessing is often sufficient. The cell phone, or other device, may successfully infer—based on various factors (time of day, user location, television location, user viewing history, other profile data, EPG data, etc.)—the content, if any, to which the user is being exposed. (A die-hard Pittsburgh Steelers fan is probably in front of a TV screen at game time—whenever the Steelers are playing.)

Once an initial inference has been made, additional information can optionally be sought to confirm or refute the initial hypothesis. For example, sound or imagery can be sampled—perhaps not enough to identify video programming in the absence of other information, but enough to reinforce (or discount) an initial inference. Alternatively, the cell phone can simply pose one or more confirmatory questions to the user, e.g., "Are you watching TV?" and/or "Are you watching the Steelers game on TV?" and/or "Are you watching program X or program Y (or neither)?"

In other arrangements, the fact of viewing activity is inferred first. For example, if the locations of a television system and a cell phone can both be determined (e.g., by GPS), and the cell phone is found to be within ten feet of the television, then user viewing of the television may be inferred from proximity alone. If an affirmative inference is made by the cell phone, it can then estimate what programming is being viewed (e.g., by reference to current EPG data, user history and profile—accessed from a home network disk drive, or cached previously in the cell phone memory, etc.). If the television system makes the determination of proximity, it knows whether it is "on" and what programming it is rendering. It can transmit such information to the cell phone, so that either can then fetch auxiliary content for presentation to the user.

Based on the thus-approximated circumstances, the cell phone can again provide a complementary experience to the user.

One way to list available auxiliary content, without cluttering the intended video presentation, is to pause the main video programming. (The pausing may be user-initiated, or triggered by the system when auxiliary content is identified or becomes available.) A graphical control can appear—on either the cell phone or the main screen—from which the user can select desired auxiliary content. The graphical control can comprise, e.g., icons representing available auxiliary content—which selection changes in accordance with the contents of the paused screen. (E.g., if John Wayne is shown in the paused screen, then biographical information or other video clips about Wayne may be shown as available; a moment later, if Ronald Reagan is shown in the paused screen, then biographical information or other video clips about Reagan may be shown as available.)

If desired, the cell phone may be programmed to cause the main video presentation to pause when a cell phone motion sensor(s) indicates a certain movement (or any movement). For example, if the cell phone senses that it is being moved from a rest position to a use position (e.g., to answer an incoming call), the television display may be automatically paused. If auxiliary content is being presented—on the cell phone or elsewhere—it too may be automatically paused.

In some arrangements, a user's cell phone is registered as being associated with the user's television system. For example, in the user's TiVo digital video recorder, a data structure may store identifiers—such as phone numbers—of associated cell phones. Information relating to video programming (text alerts, auxiliary content, video content itself, etc.) can be sent from the television system to the associated cell phone(s).

The registered cell phone may have a mode in which it is ready to present auxiliary content—call it a WatchingTV mode. (This status may be indicated by the cell phone to the associated television system, e.g., by the Apple Bonjour protocol or otherwise.) If the user's cell phone is in the WatchingTV mode, the user may be presumed to be viewing programming in accordance with past viewing history, recording history, preference data, etc. Auxiliary content can be provided to the cell phone accordingly.

In other arrangements, a WatchingTV mode is not required. Information can be sent to the cell phone based on available programming and user data, which the user can choose to present on a screen, or not.

If the user is determined to be remote from home (e.g., by reference to location information periodically provided to the home network from the user's cell phone), the system may determine how the user can access favorite programming (determined, e.g., by reference to previous viewing history or recording history) at the user's current location, and send such information to the user's cell phone.

Similarly, reminders can be sent to alert users about programs of potential interest that are upcoming—localized to the user's current location.

Although not presently implemented by TiVo, TiVo's design can be altered to support two or more users—each having their own viewing preference data, recording history data, and other profile data. Each user can have one or more associated cell phones registered with the TiVo device. When the television system is operated, but the user is not expressly declared, the system can infer the user's identity from various factors (e.g., comparing the content metadata, such as genre, title, synopsis with stored data for each user; considering time of day; determining the current locations of associated phones and identifying any that are proximate to the system; applying facial recognition techniques to image data captured by a camera to help sense particular users, etc.). System operations can then be tailored in accordance with the inferred user identity.

It will be recognized that the cell phone can serve as a "second screen." The user can interact with the cell phone while others in the room watch the television screen—undistracted by overlays and other interruptions to the full-screen experience. They, in turn, may interact with their own cell phones—interacting with auxiliary content of their own choosing (and exchanging text messages and other content with others in the group). Yet the group has the shared experience of the common big screen and the common physical environment.

(In some embodiments, groups can assemble on a virtual basis—from two or more locations. Each simultaneously views the same video content on a primary screen at their location, while also being able to interact with personal second screens—including online social interaction with other members of the group. The cell phones may simultaneously operate in conference call mode—allowing each person to speak to and hear others in the group.)

When two or members of a group assemble for a second screen experience (physically or virtually), information may be shared between the members' cell phones. Each user may set an option on their cell phone indicating whether visual content information may be shared with other cell phones. If this option is set, then other members of the group can "tune into" the second screen experience of any other member (or all may share the same second screen experience).

In other embodiments the cell phone need not be used to present content. Instead, it can simply provide information to other systems, e.g., identifying the user's location; or specifying—by reference to a calendar application—whether the user is free or busy; or indicating whether the user is stationary or in motion; or identifying which user is proximate to a particular display system, etc. The other systems can then adapt their operation in accordance with such information.

Some embodiments allow the user to easily transfer displayed content from a cell phone screen onto a television screen for easier viewing. Conversely, the user may transfer displayed content from a television onto a cell phone for portability. The transfer can occur during playback of video entertainment or during game play, allowing play to resume from the point of interruption.

Other aspects of the present technology enable users to participate in entertainment content, such as by submitting plot directions, audio input, character names, etc., yielding a more engaging, immersive, user experience.

In accordance with still other aspects of the present technology, a program-centric content directory is compiled from information reported by network nodes that watch and identify content traffic passing into (and/or out of) network databases. Spanning a variety of content repositories (e.g., web sites, TV networks, P2P systems, etc.), such a directory allows cell phone users to identify the diversity of sources from which desired content can be obtained—some available on a scheduled basis, others available on demand. Depending on the application, the directory information may be transparent to the user—serving to identify sources for desired content, from which application software can pick for content downloading, based, e.g., on context and stored profile data.

The foregoing are just a few of the novel aspects of the present technology. These and other features and advantages will be more readily apparent from the remainder of this specification, which proceeds with reference to the accompanying drawings.

BRIEF DESCRIPTION OF THE DRAWINGS

FIG. 4 is a representation of sample records from a database associating primary content with auxiliary content.

FIGS. 5-8 detail aspects of an illustrative arrangement by which a Program Directory Database can be compiled automatically.

FIG. 10 is a flow chart detailing an exemplary method that can be used with the embodiment of claim 9.

FIG. 11 is a conceptual depiction of part of a database used in the FIG. 9 embodiment.

FIGS. 17 and 18 are flow charts detailing other exemplary methods using the present technology.

FIG. 19 is a flow chart detailing a method of another embodiment.

DETAILED DESCRIPTION

Certain embodiments of the subject technology provide content on a user's personal screen (e.g., a cell phone) that complements content available on another screen (typically, a bigger screen).

For expository convenience, content available on the bigger screen is often termed the primary content, and content presented on the personal screen (the "second screen") is regarded as auxiliary content. Examples of auxiliary content include audio and video, web pages and other textual data, application programs and software widgets. (In some circumstances, users may regard the auxiliary content as the more relevant and, in some circumstances, view it without viewing the primary content.)

Figure 1:
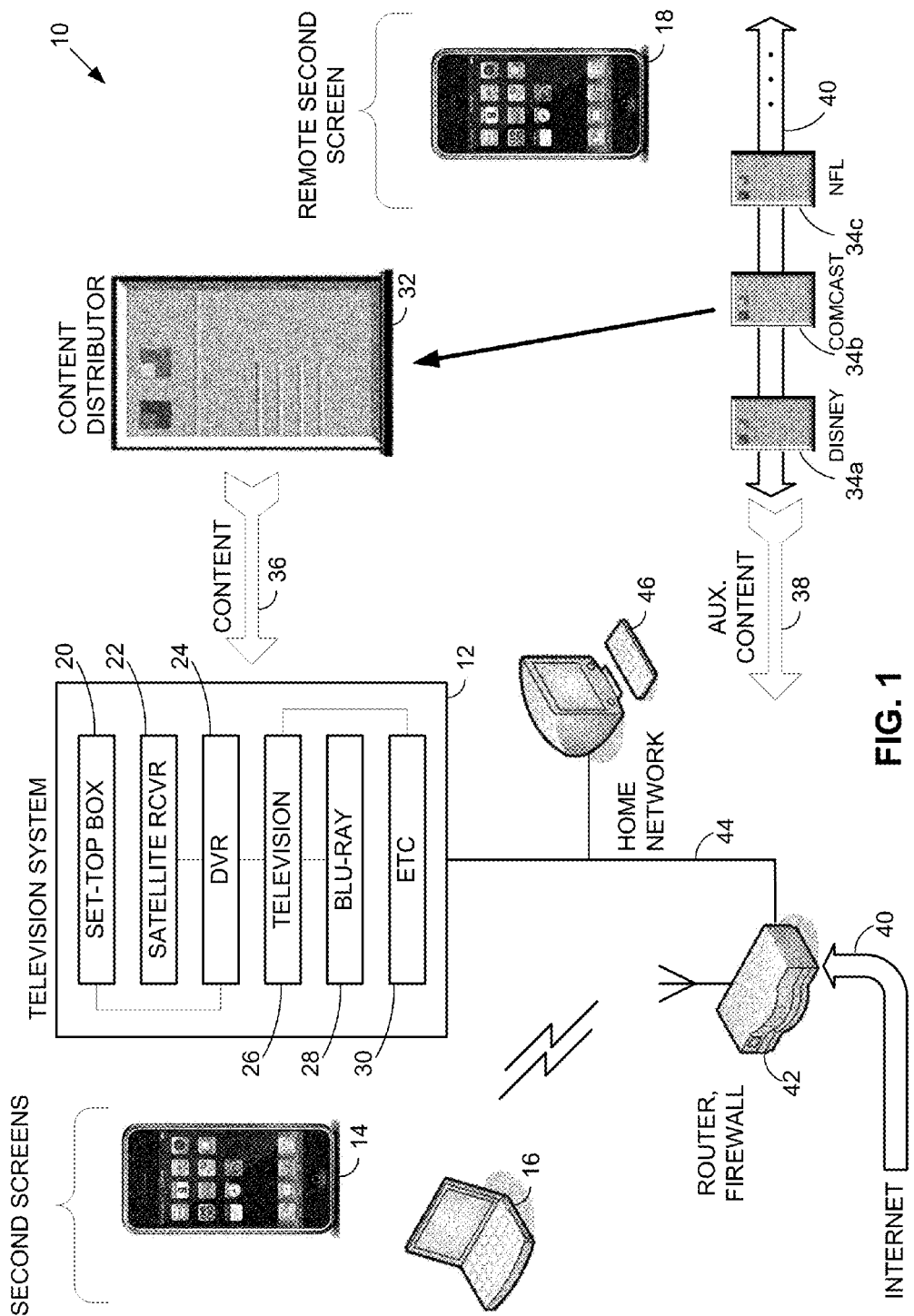
FIG. 1 shows elements of an exemplary implementation incorporating aspects of the present technology.

Referring to FIG. 1, certain embodiments 10 of the present technology can include a television system 12 and plural second screen devices 14, 16, 18.

The television system 12 may comprise elements such as a set top box 20, a satellite receiver 22, a digital video recorder (DVR) 24, a television receiver/monitor 26, a Blu-ray device 28, and one or more other components 30 (e.g., a computer, a Slingbox device, an Apple TV device, an iPod, Boxee media center software, etc.).

Primary content can be delivered to television system 12 by any communications channel 36. Examples include satellite, cable, wired- or wireless-internet, over the air broadcast, etc. A content distributor 32 (e.g., Comcast, DirectTV, a television network or station, etc.) typically aggregates content from various content sources 34 (such as film companies, content networks, sports teams, etc.) for distribution over communications channel 36. Other entities, such as the Apple iTunes store, Netflix, Google, YouTube, Hulu, peer-to-peer networks, etc., may also serve as content distributors.

The auxiliary content can likewise be delivered by any communications channel 38. Often the internet 40 is used. The auxiliary content can also come from several sources, including the same entities that provide primary content, as well as from other sources (e.g., web sites such as Flickr and Wikipedia, advertisers, Apple App store vendors, social network friends and other individuals, etc.) In some instances the auxiliary content can comprise an associated software widget, e.g., as detailed in patent application 61/150,235.

In one particular implementation, the auxiliary content is transmitted to the user's home over the internet 40, and wirelessly delivered to second screen devices 14, 16 from a router 42 over a home network 44. (Second screen content can also be provided to wired devices over the home network, such as a desktop computer 46, although this is not as common.)

Figure 2:
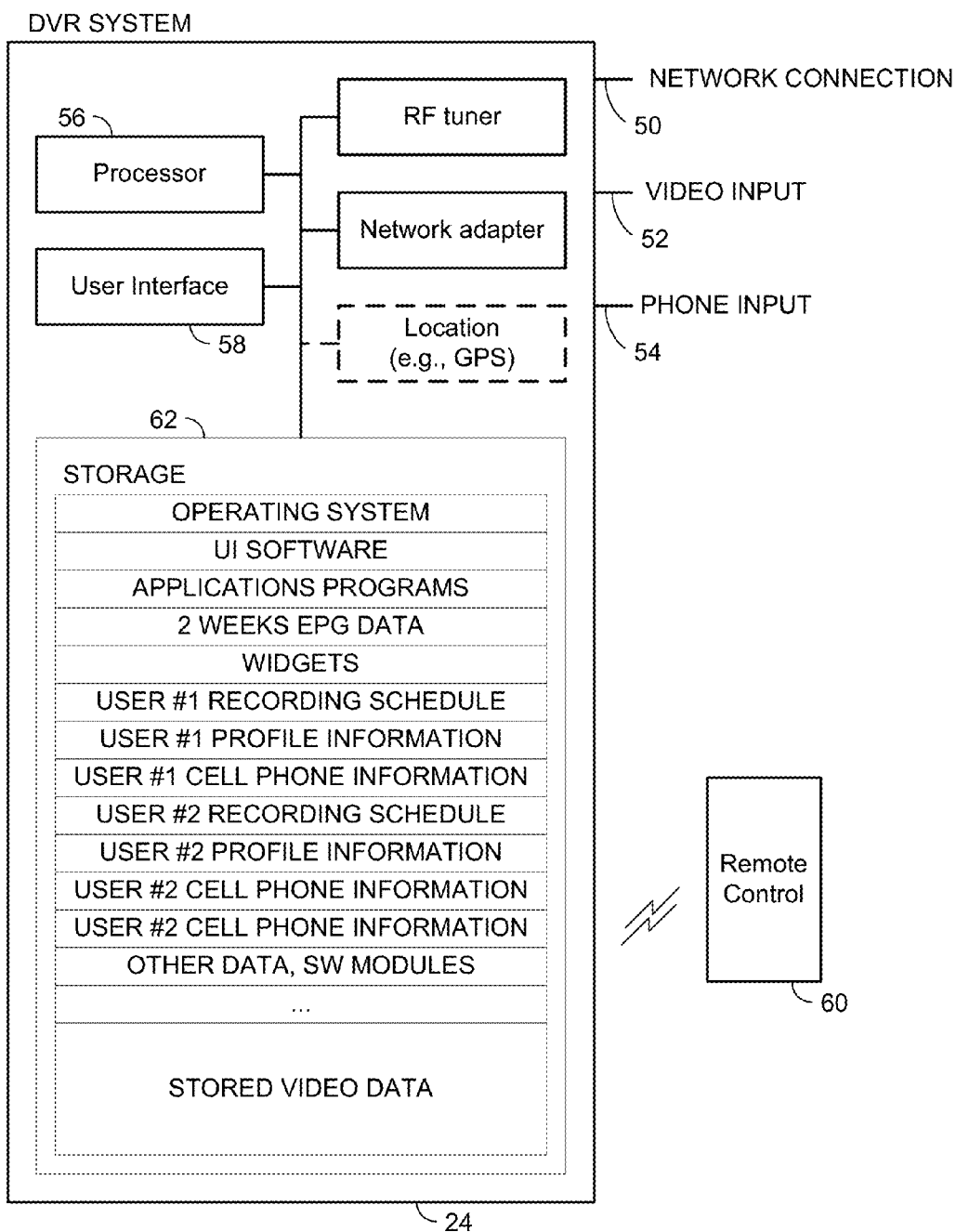
FIG. 2 is a block diagram of a digital video recorder system that can be used in certain implementations of the present technology, including certain stored data.

An exemplary DVR 24 is shown in FIG. 2, and includes a network connection 50 (e.g., to the home network 44). The DVR also has an input 52 through which video content is provided, as well as a phone connection 54. Input 52 can connect to a device such as a satellite receiver, a set top box, or an antenna, or it can eliminated if video content is provided to the DVR over the network connection 50. The phone input provides a connection by which the DVR can dial into a data center to download electronic program guide (EPG) data and other instructions periodically. Again, input 54 may be eliminated if such data is provided through the video or network inputs.

The illustrated DVR also includes a processor 56, a user interface 58 (which may include both physical controls and on-screen menus/controls), a remote control 60, and a data store 62. The data store 62 can include both semiconductor and disc storage. In addition to operating system software, user interface software, and application programs, the illustrated data store 60 also includes EPG data, software widgets (see, e.g., patent application 61/150,235), other data and software program modules, and stored video data.

Also included in data store 60 is a variety of user-specific data. This includes schedule data detailing programs to be recorded as well as programs earlier recorded, user profile data, and user cell phone data. The user profile data can include a variety of information, such as program viewing history, program recording history, season pass subscriptions and other standing recording instructions, viewer rankings and votes concerning certain programs, and other expressed viewing preferences. The profile data may also include demographic information such as zip code, user age and gender, data about affinity and social groups to which the user belongs, etc.

In more sophisticated embodiments profile data is accessed from various data stores and can encompass the user's web browsing history and other sources of information. These can include all manner of data that the user touches and in which the user leaves traces, e.g., Google search history, cached web pages, cookies, email archives, travel reservations on Expedia and Orbitz, music collections on iTunes, cable television subscriptions, Netflix movies viewed and in-queue, cell phone billing statements, credit card statements, shopping data from Amazon and EBay, GPS tracking information, social network friends, data and activities, activities and postings on photo sites such as Flickr and Picasa and video sites such as YouTube; the times of day memorialized in these records, etc. (This collection may be termed a "digital life log.")

Moreover, reference may be made to digital life log data of the user's family and friends, and for others having demographic similarities with the user (all this with appropriate anonymization and privacy safeguards).

The DVR 24 may also have a module by which its location can be determined. One such module is a GPS receiver.

Figure 3:
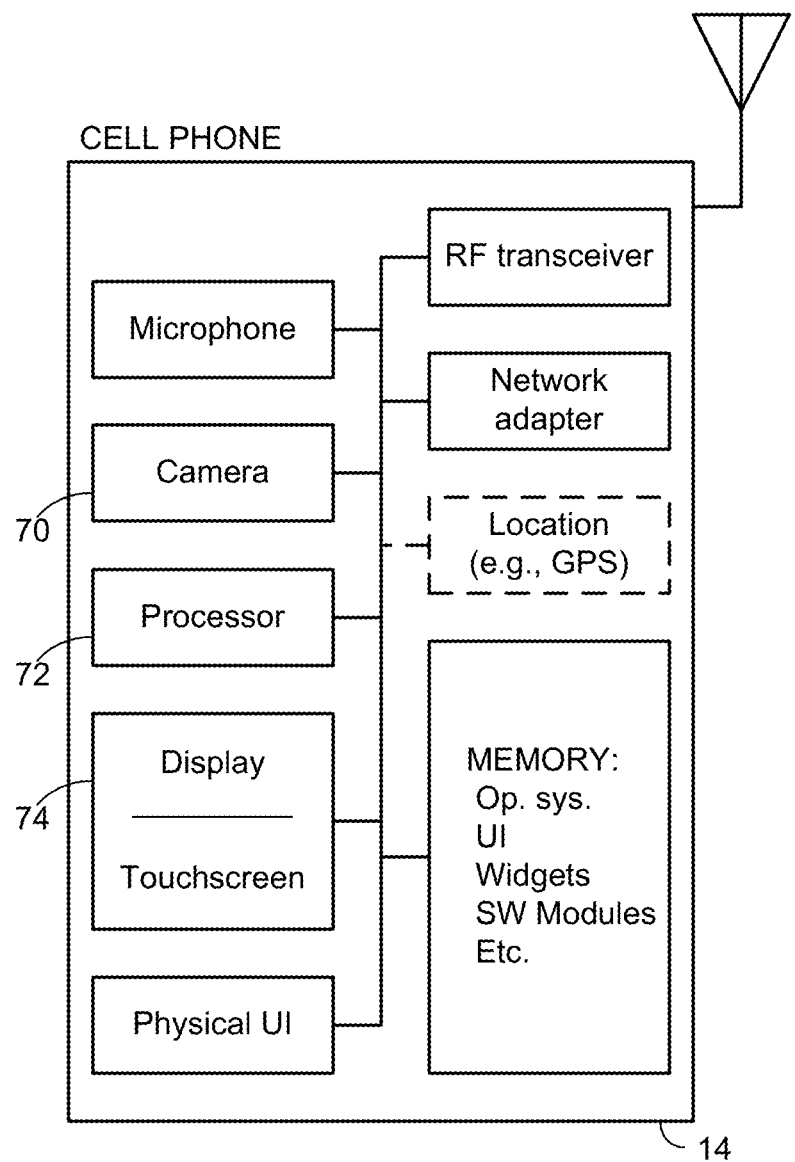
FIG. 3 is a block diagram of a cell phone that can be used in certain implementations of the present technology.

FIG. 3 shows an exemplary cell phone 14, including elements such as a microphone, a camera 70, a processor 72, a display/touchscreen 74, a physical user interface, a location module, and memory. The memory stores operating system software, user interface software, other functional software modules, widget software, etc.

The cell phone can employ a location module as described in connection with the DVR.

In accordance with one aspect of the present technology, user profile data is used in conjunction with context information to make an estimate (or inference, or guess) identifying one or more particular television programs the user may be watching (or will watch in the future). The context information can include the user's location. It may also include whether the user is stationary at that location, or moving. Additionally, or alternatively, the context information can be television program schedule information, e.g., from an electronic program guide (EPG), and/or current date/time.

To illustrate, profile information may suggest that the user is a committed fan of the Pittsburgh Steelers, and watches many other professional football games—routinely watching Monday Night Football. It may further indicate that the user watches most of the televised University of Oregon basketball games, occasionally watches some golf, and that the user's home television is most commonly tuned to ESPN.

Location information may identify the user's location by latitude and longitude. Researching this location using one of the geolocation services identified in application Ser. No. 12/484,115 (e.g., Yahoo's GeoPlanet service) may indicate that the user is at Claude's Sports Bar on S.E. Hawthorne Avenue in Portland, Oreg. The location data may also be static over a period of time, indicating the user is not simply driving past the bar.

With no other data, the system may infer the user is probably watching a sports channel on a television in the bar. The profile data indicates the user's interest in televised sports. A Google search for Claude's Sports Bar on S.E. Hawthorne in Portland finds a web page full of sports- and television-related references ("big screen" "satellite," "channels," "football," etc.). An inference engine takes these facts as inputs, identifies a set of stored rules relevant to such inputs, resolves any conflicts between the rules, and produces one or more inferences as output (e.g., that the user is probably watching television, and the watched television is probably displaying sports content).

(Artificial intelligence techniques can be applied in these and in other contexts where the present technology is employed. One branch of artificial intelligence is natural language processing (NLP). NLP techniques can be used to make sense of information like the terms found on the web page for Claude's Sports Bar. U.S. Pat. No. 7,383,169 details how dictionaries and other large works of language can be processed by NLP techniques to compile lexical knowledge bases that serve as formidable sources of such "common sense" information about the world. Wikipedia is another reference source that can serve as the basis for such a knowledge base. This common sense knowledge can be applied in the processing detailed herein.)

With more information, the system can make a more refined estimate—or a more confident estimate—about what the user is doing. For example, if the date and time indicate a Monday evening in November, an inference may be made that the user is watching Monday Night Football on ESPN. If it is a Tuesday evening when the University of Oregon is playing basketball, an inference may be made that the user is watching the basketball game—on whatever network it is airing.

If it is a Monday evening in November AND the University of Oregon basketball team is playing a televised game, the algorithm applies other heuristics and/or profile data to address the conflict: is the user watching Monday Night Football, or the University of Oregon basketball game? From data such as the user's past viewing history, the inferencing engine may estimate that there is a 70% likelihood the user is watching the basketball game, and a 30% likelihood that user is watching the football game.

Based on the inferences, the system identifies to the user's cell phone corresponding auxiliary content, e.g., of the sort detailed in the earlier-referenced patent applications. Two or more different auxiliary content options may be presented (e.g., in thumbnail or icon form; static or streaming), from which the user can select. These options may include, for example, NFL statistics for the playing football teams; a dedicated camera shot of the offensive quarterback, or an interactive game inviting the user to guess what play the quarterback will next call.

Where the system yields a probabilistic outcome (e.g., 70% chance of football; 30% of basketball), the content or options presented to the user can be weighted accordingly.

Likewise, the confidence of an inference can also influence what content or options the system offers to the user. For example, if the system is only 10% certain that the user is watching golf, it may not promote golf-related auxiliary content. Instead, it may offer default auxiliary content that more generally caters to the user's profile (e.g., highlights from recent Steelers football games and University of Oregon basketball games; commentary on their upcoming games; ESPN headlines, etc.).

In some embodiments, the system checks its inference by asking the user one or more questions. For example, the system can send a text message to the user's cell phone inquiring, "Are you watching the University of Oregon basketball game?" Or an application program on the user's cell phone might present such a question. The auxiliary content (or content options) presented to the user can be tailored in accordance with the user's response.

Instead of interrupting the user with such a query, the cell phone may simply capture audio or visual information from the user's environment (e.g., by the cell phone's microphone or camera)—seeking to confirm the estimate, e.g., by a technique such as a digital watermark decoding, or fingerprint extraction.

Television audio typically bears a Nielsen digital watermark signal inserted by the content distributor (e.g., KOIN television), prior to its transmission. The watermark repetitively conveys two items of information: a source ID, and a time stamp. The source ID has two parts. The first generally identifies the network from which the content is distributed, e.g., CBS, ESPN, etc.; the second identifies the local outlet, e.g., KOIN television, Comcast cable-West Portland, etc. The time stamp is an incrementing clock that gives the date and time of the transmission. The encoders that insert the watermarks are part of an existing network that helps The Nielsen Company track television consumption. Nielsen maintains a database that details the program lineup for each channel in each geographic market and national network, by date and time. This database is fed by program guide information compiled by vendors such as Tribune Media Company and/or TV Guide.

A customary watermark usage model is to identify an unknown television program from a watermark. In that case the watermark ID/time stamp are input as a query to the database, and the database returns output data identifying the program that was airing on that television source at that time.

The present application is somewhat different, because a guess as to the likely program(s) has already been made. In this case, information identifying the estimated program(s) is used to query the database, and retrieve the source ID (and optionally timestamp data indicating the scheduled time for the program). Audio captured from the user's environment is then checked to see if it is consistent with the retrieved source ID. (Technically, it is easier to analyze audio to determine whether one or more expected watermarks is present, than it is to analyze audio to identify whether an unknown watermark is present.)

The system assumes that the content available in the user's environment is being presented during the program slot of its original transmission. The database is thus queried to identify the source or sources that are currently transmitting the estimated program. For example, Monday night football may be distributed by ESPN and by a local broadcast station. Source IDs for these sources are then obtained from the database, and the ambient audio in the user's environment is analyzed to determine whether a watermark corresponding to one of these source IDs is present. If so, the estimate has been confirmed. (A similar approach can be employed with recorded content, although a larger universe of candidate programming must be considered.)

As noted, another approach to content identification (or confirmation) is fingerprinting. Fingerprinting works by matching features from unknown media content with features from known media content, to make an identification. Again, the present context is simpler than that usually presented, since the system has already made an estimate about the identity of the content. So the captured audio (or imagery) is simply analyzed to check consistency with the estimated program, in order to confirm the estimate. (For example, fingerprints for the estimated program may be checked for correspondence to the sampled audio; this is a simpler task than using fingerprint technology to identify sampled content from a virtually unlimited set of possibilities.)

In still other arrangements, the sampled audio or imagery simply tends to confirm that the user is watching television, rather than engaged in some other activity. For example, television audio often has a spectral distribution that can be distinguished from, e.g., the spectral distribution of two people engaged in conversation. Television audio is frequently band-limited and compressed (limited) to increase its average power, and to concentrate its energy where the human auditory system is most acute. Similarly, TV video has distinctive visual features. CRT television monitors use color phosphors that produce characteristic peaks in the visual spectrum. Television screens are refreshed at a fixed rate, by which their imagery can be distinguished from natural scenery. These and other hallmarks can be used to help confirm that a user is watching television instead of, e.g., engaged in discussion or watching a live football game.

In one implementation, the processing described above is performed by processor 72 and associated applications software in the user's cell phone. In other implementations this processing takes place in the user's DVR, or at a cable company server, or in the cloud, or elsewhere (or distributed among such processors).

Sometimes the user may be traveling in a city remote from home. The user's position is known by GPS or otherwise. However, the television programming available in that remote city may be different than that normally tracked by the user's cell phone or the home DVR. In such cases the system can use online resources, such as the TV Guide web site, or data from Tribune Media Company (or the Program Directory Database detailed below), to determine the availability and scheduling of content in the remote city. With knowledge of the programming line-up available in the remote city, together with the user's location and profile information, the system may still estimate a particular program that the user is currently watching (or may watch in the future).

Information about the user's estimated viewing activity can be sent back to the user's home (if it was determined by a remote device), where it can be stored or otherwise used as particular applications may require. If the user confirms a viewing activity, this information can be similarly logged, e.g., in a data store coupled to the user's home network.

The arrangement just-described guesses at what the content the user is presently viewing, and acts accordingly. A similar procedure can be used to guess what content the user will be viewing in the future—or may be interested in viewing. Auxiliary content, or reminders, can then be sent to the user—immediately, or later.

A particular implementation receives data indicating a location of the user (e.g., a location of the user's cell phone) and, in conjunction with profile data relating to the user, identifies one or more upcoming television programs that the user may want to view. Alerts are then sent to the user (e.g., to the user's cell phone) about the upcoming television program(s). The alert may invite the user to press a button, or otherwise signal, if the user is (or will be) watching the program. Again, if the user is remote from home, program line-up data from the media market where the user is currently located can be used to customize the alert.

The profile data may be as simple as information indicating that the user's home DVR is set to record a particular program at a particular time. For example, the user may have earlier operated the user interface of a home TiVo device to program a "season pass," instructing the device to record all broadcasts of Minnesota Timberwolves basketball games. At the time of each game, or a brief interval in advance (e.g., 5, 15 or 60 minutes), the system may send the user a reminder that a game is about to air. (In the DVR shown in FIG. 2, the user's cell phone number is known to the DVR—allowing it to send such a reminder by a text message, a voice alert, etc.)

If the user confirms viewing a particular program (or if viewing is confirmed otherwise, e.g., by audio sampling), this fact can be relayed to the network, to the content creator, or to other parties—allowing them to offer complementary auxiliary content. To illustrate, a user may be invited to participate in an online poll to determine Player of the Game for a football game, or who should be voted off the island in a reality show. The outcome of the primary content may thus depend, in some measure, on involvement of the audience with the auxiliary content. (This feature is discussed in further detail, below.) In another example, a user is presented with occasional trivia, e.g., that President Obama is a longtime Pittsburgh Steelers fan. If user profile data is shared with the networks etc., they can better engage the viewer with meaningful auxiliary content.

In some embodiments the user can respond to the alert by requesting that the scheduled program be transmitted to the user's cell phone for viewing.

Just as the fact of a user viewing a television program may be inferred, so may be the fact of a user discontinuing viewing. This can be done, for example, by sensing audio or image data using the cell phone. It may additionally or alternatively involve sensing movement of the cell phone (such as by accelerometers, or movement of visible features in a field of view of a cell phone camera).

If the viewer has apparently stopped viewing the television, corresponding action(s) may be taken. One is to pause the programming, so that the viewer can resume watching at a later time. Another is to send the viewer information about a missed portion of the content. This can comprise key frames, video highlights, a textual synopsis, etc. One or more of these can link to a recorded version of the missed content.

As noted, one or more cell phones may be associated with a particular television system, e.g., by registration data in a DVR data store, or elsewhere on a home network. Information can then be shared between the system and one or more of the associated cell phone(s).

In a particular arrangement, a husband and wife both have cell phones registered with a family TiVo system. Each may have their own TiVo profile including, e.g., preferences, viewing history, video recordings, season passes, etc.

In some cases it is clear whether the husband or wife is associated with a given program. For example, a program may have been recorded at the instruction of one or the other, and appear on their respective list of recordings. When the television plays the recorded program, it may direct auxiliary content (or a message about the availability of auxiliary content) to the person who scheduled the program for recording.

In other cases there is ambiguity about which person (or both) is associated with a program. Consider a Saturday afternoon when someone turns on the television system and tunes to a golf broadcast. Who is watching? A variety of heuristics may be applied.

One is to analyze past recording history. If the wife's list of recordings includes golf broadcasts, but the husband's does not, then the system can infer the wife is watching. Data may thus be directed to the wife's cell phone. Other profile data can be used to similar effect.

Another approach is to sense location of one or both phones. Data can be sent to whichever phone (or both) is near the television system.

The phone may be running the Bonjour protocol—advising other devices on the home network of who it is (e.g., to which spouse it belongs) and what it is doing. The television may receive this broadcast and thereby identify a phone watching television.

A variety of other arrangements can also be adopted. For example, the television system may include a camera and facial recognition algorithm to identify the viewer(s). It may monitor periodic transmissions from the cell phone by which it identifies itself to the local cell site. Or the television system may simply inquire of one spouse whether they are watching golf. If the person responds 'yes,' auxiliary content information can be sent to that spouse; if 'no,' the auxiliary content information can be sent to the other spouse.

In the example just-given, the television system is proactive: seeking to identify a viewer so that auxiliary content may be provided. In other arrangements it works the other way. A user may operate a cell phone (e.g., by launching a WatchingTV application) to indicate interest in auxiliary content or other interactivity. A logical association is then determined between the cell phone and a television system. This association may be ad hoc, or determined by information previously-stored in a data registry or the like.

An example of the ad hoc case is a phone that senses it is near a television system, such as by location determination, by Bonjour broadcast from a local wireless network, by watermark or other distinctive feature of ambient audio/video, etc. (Identity of the television system may be established by decoding a digital watermark encoded in content rendered by that television system, where the watermark conveys an identifier of the particular television system.) Once a logical association is established, auxiliary content corresponding to primary content displayed on the television is provided for the user's enjoyment. (As in other cases, the auxiliary content may be dependent on the user profile, user location, etc.)

In the other case, the logical association is determined by information previously-stored in a data registry or the like. An example is a phone registered with the user's home TiVo system. In some instances the user may not even be near the associated television system. Nonetheless, the user's cell phone can consult with the associated television system and present related information to the user. The presented information may simply comprise the status of the television system, or the name of a program being viewed or recorded on that system. Or it may comprise auxiliary video or web content corresponding to content being processed (or earlier stored) on the associated system. (Here, as in the other embodiments, the cell phone may present a menu from which the user can select among plural options. If several different items of auxiliary content are available, the menu may comprise thumbnail views of the content—including motion video—from which the user can select.)

It should be recognized that the second screen auxiliary content may be some or all of the primary content, depending on the application. For example, in a circumstance earlier-discussed—in which a user is alerted to a program about to be recorded on a home DVR—the auxiliary content may be the primary content re-formatted and streamed for presentation on the user's cell phone display. The user interface on the cell phone can alert the user to the availability of such content, which can be played by a corresponding gesture on the phone's touch-screen interface.

In this and other embodiments, the user may respond to an offer of auxiliary content by instructing that the auxiliary content also be offered, or directed, to one or more other cell phones or second screens. Thus, when a user's cell phone is alerted that a Timberwolves game is beginning, the user can forward the auxiliary content to the user's laptop, and also offer the auxiliary content to the cell phone of a classmate who is also a Timberwolves fan. Such relaying can be done by wireless from the user's cell phone (e.g., by Bluetooth for nearby second screen devices, or by WiFi and then internet to more remote devices). The Bonjour protocol can alternatively be employed—transmitting data that can be received by all devices on the home (or other) network.

In some embodiments the user's cell phone may instruct that the auxiliary content be distributed to the designees from an upstream node in the distribution process (e.g., from one of the servers 34 in FIG. 1, or from the user's home DVR 12, etc.).

The content may be shared with individuals with whom the user has an association (e.g., "friend" status on a social network), or to individuals who are physically nearby, or to individuals in the user's phone book, or on a common network, etc.

The shared content may appear on the other person's cell phone in a sub-portion of the display screen, e.g., in a window. By selecting the window, the other person may cause the display to occupy the full screen. Desirably, the content is presented simultaneously on all screens on which it is displayed.

In some implementations, the DVR can be programmed to send program alerts to multiple individuals, and make auxiliary content available to each if requested.

It is not necessary to know the user's absolute location in order to infer that the user is watching television. In other arrangements the mere fact that a user is in proximity to a television can be inferred, and action can be based thereon.

Various techniques for inferring proximity were discussed above, e.g., detecting characteristic features of audio and imagery produced by televisions, as contrasted with other audio and imagery. Low level stray emissions from televisions or other video equipment can also be detected (e.g., the color burst oscillator of an NTSC television; the refresh rate for a television screen, or a video scanning frequency, etc.). A Bonjour protocol transmission from the television can also be used.

Conversely, the television may detect the nearby presence of a cell phone, e.g., by the near field RF signal regularly transmitted by the phone to the cellular network, by the near field WiFi signal sent to a nearby router, by a Bluetooth emission, by a Bonjour protocol transmission, etc. The television system can identify the cell phone by such transmission, and—once proximity is established—an estimate can be made of the television content that the user is most likely viewing.

Once proximity is established between a user and a video screen, auxiliary content can be provided to the user in accordance with user profile data.

Eventually the day may come when all devices know their own location, such as by one of various emerging geolocation arrangements (e.g., as detailed below). They may share this information with local devices (e.g., by wireless and/or Bonjour), and/or post the location data to a networked data store—where it can be accessed by other devices. In this environment the user's cell phone can learn the location and identity of nearby electronic devices (which may be presented in map form). If a television monitor is found to be near the cell phone, the system may infer that the user is watching the television. ("Nearby" depends on the particular requirements of a given application. In some cases ten feet may be nearby. Sometimes twenty. In the case of a Jumbotron video monitor, ten or a hundred yards may be considered nearby.)

Next generation video systems may also publish data (e.g., wirelessly, by Bonjour, or to a networked data store) identifying the content they are displaying. In such case an estimate of the content no longer needs to be made. The video equipment unambiguously makes this information available. Systems using the present technology can access such information and, based thereon (and, optionally, on profile data), provide corresponding auxiliary content to the cell phone of a nearby user.

In these examples, as earlier, the system may seek confirmation, e.g., that the user is actually watching the video content being displayed on the nearby screen. Such confirmation may be sought recurringly, rather than just once.

In all of these examples, the auxiliary content need not be presented on the user's cell phone. It may be presented on the big screen with the primary content (e.g., in a window). Or it may be delivered otherwise.

In addition to (or as an alternative to) presenting information or content to the user, a cell phone can simply provide information to other systems. For example, it can identify the user's location; or specify—by reference to a calendar application—whether the user is free or busy; or indicate whether the user is stationary or in motion; or identify that a user is proximate to a particular display system, etc. Next generation cell phones may report biological indicators, e.g., suggesting whether the user is asleep or eating, etc. The other systems can then adapt their operation in accordance with such information.

For example, if a television system in an airport lounge senses the stationary nearby presence of Jane Doe (or more accurately her cell phone), the television system may retrieve profile information for Jane Doe (e.g., from the phone or an online resource), and identify what video programming may be of most interest, e.g., a current LPGA golf tournament. The television can automatically present such programming to Jane while she waits. When Jane leaves and John Smith sits down, the television may similarly tune to CNBC.

Instead of, or in addition to, selecting primary programming, such a system can identify auxiliary content of particular interest to the nearby user. For example, John Doe's cell phone may make available, over a WiFi network or Bluetooth, the names of stocks on his default Yahoo Finance portfolio (but not the share amounts). The television system can automatically overlay a small window on the CNBC screen, scrolling current prices for those stocks.

Thus, while cell phones according to the present technology can respond to the user's environment, they also allow the user's environment to respond to the user.

More on Auxiliary Content

The item(s) of auxiliary content that is made available with a particular item of primary content may be selected by the provider of primary content (e.g., a video network, such as ESPN), or another network or commercial entity. However, an alternative is for auxiliary content to be crowd-source-identified, e.g., in social network fashion.

The social network can be defined in advance (e.g., Facebook friends of John Doe, or high school students in Portland, Oreg.), or it can be ad hoc (e.g., whoever is currently watching tonight's Timberwolves game).

Individual users may find their own auxiliary content. For example, high school students watching a James Bond movie may browse to the Austin Martin home page, or to the home page for the United Kingdom's MI6 Secret Intelligence Service. Retirees watching the same movie may tend to browse to the Wikipedia page for "Shaken, Not Stirred." Or to the Tanqueray Gin home page.

Similarly, when watching NBA Minnesota Timberwolves basketball, high school students at the alma mater of player Kevin Love may navigate to the page at NBA.com with Kevin's statistics, or to a YouTube video of him breaking a basketball backboard during a celebrated high school game.

Data noting such selections can be gathered in a publicly accessible database, and can serve as a resource from which others can identify relevant content. Each item of auxiliary content may be associated with (1) profile information about users who viewed it, and (2) information identifying content with which it has been associated.

One implementation employs a relational database that can group data using common attributes. A schematic representation of data in such a database is shown in FIG. 4.

Naturally, this is just a sampling. The database desirably includes, or has access to, other data. This other data can include metadata associated with each item of content—classifying by genre, actors, keyword descriptors, ISAN (International Standard Audiovisual Number) and/or DOI (Digital Object Identifier), date, etc. Additional profile data for each user can also be provided, e.g., telephone number area code and exchange; IP address (or domain), and profile information noted earlier.

This data can be mined in other ways. A person who independently browses to the MI6 official site might be prompted to consider viewing the Goldfinger movie, etc. A web browser may briefly overlay a sidebar on presented content, advising "Users that were interested in this page were also interested in the following: <identification of other content>"

Such a database can be hosted on a discrete computer, or distributed (and/or replicated) among many different platforms. Peer-to-peer arrangements can be employed, with different parts of the database residing on different users' machines.

Such a database may be managed in wiki form, with users expressly contributing and annotating the listings. Another alternative is for a vendor such as Google to compile the data. A new service (e.g., "MediaGuide") could then be provided, which would provide a ranked list identifying items of auxiliary content (e.g., web pages) that are most commonly consumed with a given item of primary content (e.g., a television show).

Already, assenting users of the Google Toolbar product provide data to Google identifying visited web sites. The Google Toolbar can be enhanced to also provide Google with data identifying media content that is present in the user's environment during web browsing (a background media data collection mode).

The media content can be identified by the various techniques detailed in this and the incorporated-by-reference documents, including digital watermarks, fingerprints, etc. The Google Toolbar may fully identify the content (e.g., by decoding a watermark from captured audio), or it can simply perform some processing of captured audio (or video), and forward the processed data to Google's servers for completion of the identification task, such as by fingerprint matching. (The processing desirably removes personally identifiable information, such as by making the audio unintelligible. One type of such processing is Wiener filtering, or subtracting the short-term average of the audio amplitude from its instantaneous value. Another is by extracting the timing and frequencies of certain landmarks in the audio, e.g., as detailed in Shazam's U.S. Pat. No. 7,359,889.)

The ambient media needn't be identified with a high degree of certainty. Guesses based on incomplete data or circumstances (as described elsewhere in this specification) can often suffice—especially when large numbers of such data are collected. Associations between primary content and companion auxiliary content based on correctly-identified primary content tend to cluster; clear patterns emerge. For example, many viewers of Oprah's television program may visit web pages for the Oprah Book Club and for personalities appearing on Oprah's show; many viewers of CNBC may visit the Wall Street Journal web site and the Yahoo Finance web site. Associations based on mis-identified content, in contrast, are un-clustered; they don't occur with the frequency that would place them among the top ranked search results. So even if the media identification were correct only 20% or 2% of the time, useful associations would eventually emerge.

In other embodiments, no guessing or discernment is required; the primary content is expressly identified by data from the television system, or from a device elsewhere in the distribution/rendering chain. For example, a TiVo box knows what content it is supplying to a television monitor, and it can make this identification data available to the Google Toolbar. In one particular embodiment, software in the TiVo system employs the Bonjour protocol to inform other devices within the home network of the identity of the video being currently rendered. The Google Toolbar software can receive this broadcast, and forward same to Google (as it forwards data identifying visited web pages).

In query mode, the contemplated MediaGuide service takes identifiers of primary content as input, and provides a ranked listing of corresponding auxiliary content identified from the database as output. The input identifiers may be keywords typed by a user, e.g., Oprah or CNBC. Alternatively, the user's device (e.g., a module associated with the Google Toolbar) may simply sample the ambient audio (in response to user command, or automatically) and provide associated identifiers to the service. These identifiers may be text keywords (e.g., program title), or other identifiers that are associated with a particular program (e.g., watermark payload, audio or video fingerprint, etc.) In some embodiments, the captured audio data, or processed audio data, may be submitted as input, and the Google servers can identify the primary content based on this audio data—and respond with ranked identification of corresponding auxiliary content.

In still other embodiments, the primary content is expressly identified by data from the television system, or from a device elsewhere in the distribution/rendering chain, as detailed above.

Results from such a MediaGuide query may be presented in the same familiar format as Google's web search results. Hyperlinked results from the database fill most of the screen. To the edge can be placed sponsored links. For example, Nike may pay to present a link to its Air Jordan web page on the top right of a page of results to a media query based on a Trailblazers basketball broadcast.

After an initial corpus of primary content-auxiliary content association data is collected, use of the system in query mode allows further media association data to be collected. The Google Toolbar can note which auxiliary content search results are selected when different primary (ambient) media is present. This information is sent to Google and can inform future searches based on that primary media content.

The search results may be customized for the user's demographics (e.g., age, gender, zip), if demographic data is known while in media data collection mode. For example, a MediaGuide query based on a Trailblazer basketball game by a 19 year old male in Portland can report the most popular auxiliary content consumed by other users of similar profile.

It will be recognized that the just-detailed arrangement is a departure from the usual careful scripting of content consumption. Historically, commercial entities—such as advertisers and content networks—paired primary content with auxiliary content (consider broadcast television and associated commercials). The present approach, in contrast, taps a wealth of information by examining actual user behavior—establishing appropriate content pairings organically rather than by fiat.

While described in the context of Google offerings, any number of particular implementations is of course possible. One employs Personal People Meters (PPMs)—pager-sized devices that sense ambient media for audience survey purposes (see, e.g., Nielsen patent publication 20090070797, and Arbitron U.S. Pat. Nos. 6,871,180 and 7,222,071). Audience survey companies recruit and compensate individuals to wear such meters. These same individuals may be recruited to install software with their web browsers to report what web sites are visited, when. An individual's web site data and PPM data can then be temporally correlated to establish associations between web content and broadcast content.

Similarly, instead of using the Google Toolbar software, such data collection can be effected by a network-connected media monitoring device, such as the one detailed in Nielsen's patent publication 20080320508.

It will be recognized that the technology detailed herein offers enhanced audience measurement for television and other content. The operator of such a system receives real-time information about the consumption of media worldwide. Audience analysis techniques, such as used by Nielsen and Arbitron, can be employed.

Moreover, the detailed system provides another dimension of audience information, namely information about co-consumed content. This can be of particular use to advertisers.

Consider a company that wants to promote its product to a particular demographic that is not tracked by traditional television audience measurement surveys, e.g., frequent leisure travelers. In the past, other metrics have been used as gross proxies for the desired demographic, e.g., persons 49-64 with incomes over $100,000. But this is unsatisfactory—often identifying programs that are not relevant, or failing to identify programs that are relevant.

Paired with web visit data, however, television audience measurement takes on new meaning. Instead of identifying a demographic proxy for the targeted group, the advertiser queries the just-detailed database with web sites that serve the targeted group, e.g., Expedia, Travelocity, Priceline, Hotwire. In this mode of operation the database responds with the names of television programs that most commonly are being rendered while such sites are being visited. Television programs that provide the desired audience demographic are readily and confidently identified.

If a company wants to advertise on television programs popular with off-roaders, it queries the database for programs associated with the web sites Fourwheeler, Offroaders and Pirate4×4. If a company wants to advertise on television shows watched by families dealing with Alzheimer's disease, it queries the database for programs most-commonly watched while surfing the Alzheimers' Association web site. For programs watched by online gamers, it searches the database for programs airing while users are at popular gaming sites (e.g., World of Warcraft).

Such an approach provides a significant advance in the accuracy of television audience measurement. No longer are viewers classified solely by generic demographics such as age, geography, income, education, etc. Now their subjective interests are revealed—factors that distinguish statistically identical neighbors. And such interests are not collected using questionnaires of uncertain reliability, but by reference to actual web browsing habits.

The ambient media information can be used in other ways as well. One is as cookie information. Cookies have long been used to allow websites to tailor their presentations to returning users, e.g., customizing the presented information based on users' past activities or interests. Likewise, information about a television program currently being rendered to a user can be relayed to a web site to which the user surfs, and the web server can adapt its presentation accordingly. If sports programming (e.g., content from ESPN) is sensed in the viewer's environment, and the user navigates to the New York Times website, the Times web server may present sports news more prominently than otherwise. Similarly, if the program Washington Week in Review is playing in the user's environment, the Times web site may give greater prominence to national political news in the first web page served to the user.

This need not be implemented using traditional cookies. Other data exchange arrangements can be used. One data exchange arrangement is as header data in the HTTP packet sent to the New York Times web site, asking for a page to be loaded. The header data already carries a variety of information, such as data identifying the web site from which the user just navigated (the referring page). It can also carry data identifying the television program currently playing in the user's environment, so that the responding web site can adapt its content accordingly.

In this embodiment, as in others, the data identifying the television program can be of any form. Examples include ISAN identifiers, time/channel data, audio data from which a remote detector can discern identifying watermark or fingerprint data, decoded watermark data, fingerprint data, EPG coordinates from a TiVo system, text title data (e.g., from an EPG), etc.

Organically Compiled Program Directory

The concept of a program guide is an old one, dating back to the earliest days of television, and printed *TV Guide* magazines. A gridded structure is used, with columns indicating time (usually in 30 minute increments), and rows indicating channels.

With the development of cable networks featuring large numbers of channels, this gridded format migrated to scrolling on-screen guides—originally delivered on cable channels dedicated for this purpose.

A great number of subsequent technical developments have occurred in the field, but the gridded time/channel format remains entrenched.

Schedule data for *TV Guide*, and the later electronic counterparts, has traditionally been compiled by a labor intensive process. Clerical workers at *TV Guide*, and later Tribune Media Services, called television networks and individual stations on a regular basis to obtain program lineup information for the week ahead. When last minute program changes occurred—as unavoidably happens—the guides presented incorrect information.

In accordance with aspects of the present technology, the inventors believe that it is time to disintermediate programs from channels. The consumer has a display screen, on which content desirably appears (whether from TV broadcast, cable, web streams, iTunes, Netflix, peer-to-peer networks, etc.). Channels as an organizing principle have outlived their usefulness. (Identifying content by reference to channels is akin to identifying postal mail by reference to the name of the mailman that brings it to the door, or identifying a web page by reference to the data's routing through nodes of the internet.) How content gets to the consumer's screen is of secondary interest—if that.

An embodiment incorporating this aspect of the technology may refer to a program-centric directory that details multiple alternate sources from which content may be available. Instead of indicating a desired channel, a consumer indicates a desired program. An automated system, referring to the directory, chooses from among the available sources and presents the desired content on the screen. Only rarely does the consumer need to be involved.

In one particular embodiment, the system employs stored heuristics and rules, which cooperate with user preference and profile data, to choose from among different sources for content. A user may express a preference, or a requirement, for downloaded content over streaming, free content over paid, no commercials, resolution of at least 1024×768, no delivery for sources that may be unauthorized, etc. Some such preferences may apply across all content types; others may be tailored to particular types of content (e.g., theatrical movies and sports: prefer resolution of at least 1024×768; current events and comedy: prefer resolution of at least 720×480; paid content: require no commercials). The preferences/requirements can be applied in a particular order (e.g., always exercise the user's first preference, where possible, without regard to whether meeting that preference means other preferences will not be met). Alternatively, the preferences can be accorded different relative weightings, with a final choice made only after each alternative has been scored in the aggregate—considering all the relevant preferences and weightings.

Sometimes the rules/heuristics will refer the decision to the user. For example, a rule may specify not to automatically authorize any content payment exceeding $0.99 ($2.99 in the case of a movie within two weeks of its theatrical release). The user can then specify, through a phone or other UI, whether to authorize the payment.

In other cases the user may specify and ordered list of preferred providers. Obtain from Hulu, if available; else obtain from YouTube, if available; else obtain from iTunes, if available; else present options to user for manual selection.

FIG. 5 illustrates a database record corresponding to an episode of the Daily Show program. The illustrated data structure gives information about the program, and lists various sources from which the program is available. Some are web sources. Some are TV sources. One is from a P2P network (LimeWire).

Associated with each of the listed content outlets is further information about the content (metadata), such as an identifier used by that outlet (e.g., 77973 for Hulu), the ISAN number for the content (where available), and information about availability of the content from that outlet.

For some outlets, the availability information indicates that the content is available "on demand." The information may further specify when the content was first available from that outlet, and may specify when availability is expected to end.

For example, the sample Daily Show episode was available on Comedy Central (its originating network) at the date and time the episode originally aired (i.e., 8:00 pm on June 15), and is available until midnight on the Sunday before the fifth week anniversary of the original airing. The copy provided to Hulu, however, was embargoed for an hour—not being available from that source until 9:00 p.m., and is available from that source for only 30 days.

In the case of television broadcasts, the data structure includes a pointer to a list of arbitrary length, detailing the original airing and all scheduled repeats of the program. Thus, the Comedy Central TV entry shows the original 8:00 p.m. airing, followed by a repeat at 10:30, 7:30 the next morning, etc. (In the illustrated data record, all times are Pacific.)

Included in the same database as contains the FIG. 5 information, or in another, is a data structure that maps television networks to channels. For example, Comedy Central is channel 107 on the Dish Network, channel 55 on Comcast, etc. By reference to such information, a user's system can locate the desired programming on different distribution systems.

Figure 6:
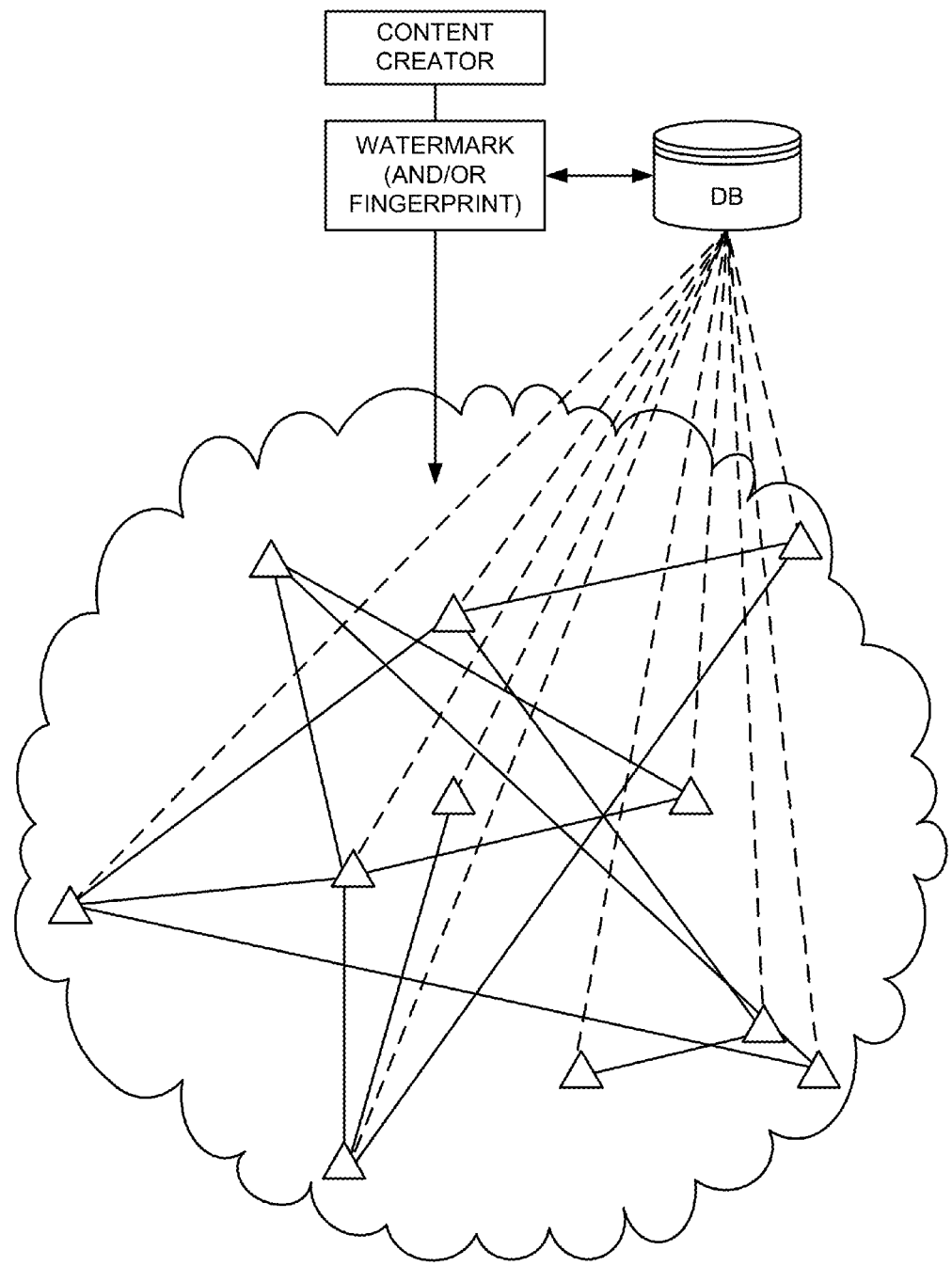

FIG. 6 shows how the source data is collected. The content creator provides each item of content with an inherent identifier that can be digitally extracted from the content wherever it goes. Digital watermark technology is preferred, although fingerprinting can also be used. The identifier is stored in a database, together with metadata about the content. The content is then distributed to one or more recipients, such as television networks, web sites, etc.

Recipients of the content are equipped with watermark (and/or fingerprint) detectors (shown by triangles in FIG. 6) that read the content's inherent identifier, and issue reports back to a database. (See, e.g., Digimarc's patent publication 20070208711 for additional information about such watermark/fingerprint detectors.) Desirably, each recipient includes recipient-specific information with the report, such as particulars of the intended use. These particulars may include scheduling data (e.g., when the content is to be broadcast, when it is to be downloadable from the web, when availability will be discontinued, etc.). Other information may also be included, such as the format(s) in which the content is/will be available, the identifier assigned to the content by the recipient's system etc. The database thus has a record of where the content is stored, together with all of the other recipient-contributed information.

In addition to locating detectors at content ingest points for authorized distributors, the detectors (triangles in FIG. 6) may also be placed elsewhere to identify the content at other locations, such as it leaks to unintended destinations. For example, an individual may download the content from a web site, and re-post it on a P2P network site. A detector at an internet node may sense the P2P traffic, and submit information to the database identifying the P2P network as an alternative source for the content.

Figure 7:
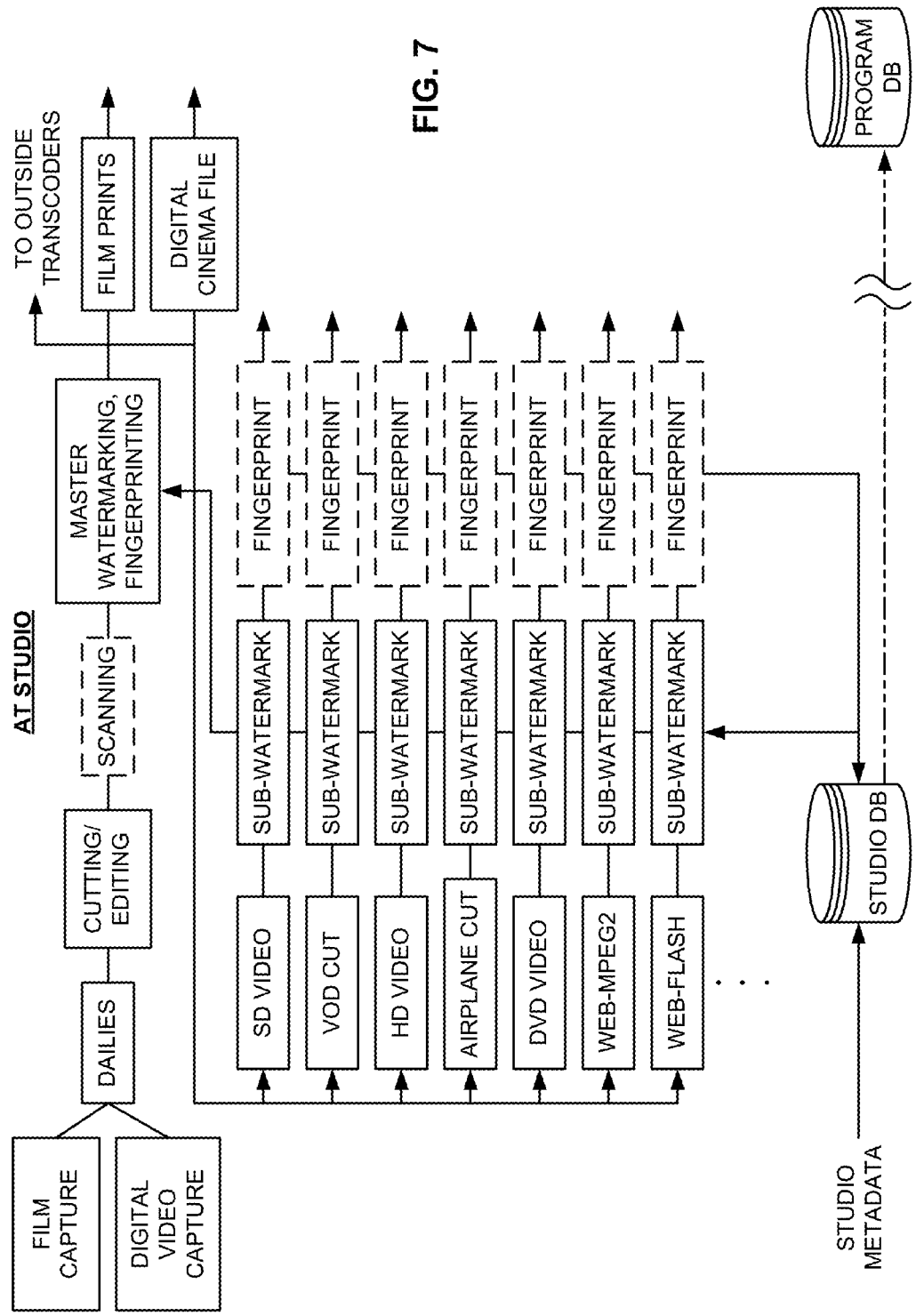

FIG. 7 shows the content creator's (e.g., a movie studio's) part of the process in greater detail. The content is originally created by film or digital capture. Dailies are reviewed by the production team, and editing takes places. If the content is originated in film, it is scanned into digital form.

The content is then digitally watermarked with a studio-assigned identifier. (In some arrangements the content is watermarked still earlier, such as at the production of dailies.) The watermark identifier is stored in a studio database, in association with metadata about the content. (Alternatively, or in addition, fingerprint data is extracted from the content, and similarly stored in the studio's database with associated metadata.) Film prints and digital cinema files are created and distributed.

The content creation process does not end with the theatrical release materials. Dozens of other cuts and/or formats of the content may be produced, e.g., for television (in both standard definition and high definition), video on demand, airplane viewing, DVD releases, web vide in a variety of formats including MPEG2, Adobe Flash, Windows Media Format, etc., etc. The content may also be sent to outside transcoding companies (e.g., Rhozet/Harmonic) for creation of files in still other formats.

Desirably, the watermark is of a variety that allows successive layers of watermark data to be added. In such case, a second, different, watermark is applied to each variant of the content. These identifiers, too, are stored in the studio database with other associated information (e.g., about the cut and format).

The studio's database typically contains a great deal of proprietary information. Thus, portions of the data suitable for public dissemination (e.g., program title, synopsis, running time, watermark/fingerprint information etc.) may be sent to a different database, shown in FIG. 7 as the Program Directory Database. This is the database in FIG. 6 that collects reports identifying all the sources from which the content may be available. It may be administered by an industry association (e.g., the MPAA) or a contracted service provider (e.g., Secure Path).

In other arrangements, suitable protection mechanisms may allow portions of the studio's internal database to be made accessible to outsiders for limited purposes. In such case, the database of FIG. 6 may comprise a federated database—with many different portions, maintained by different studios and other content creators. Combinations of external and internal databases can also be used.

Figure 8:
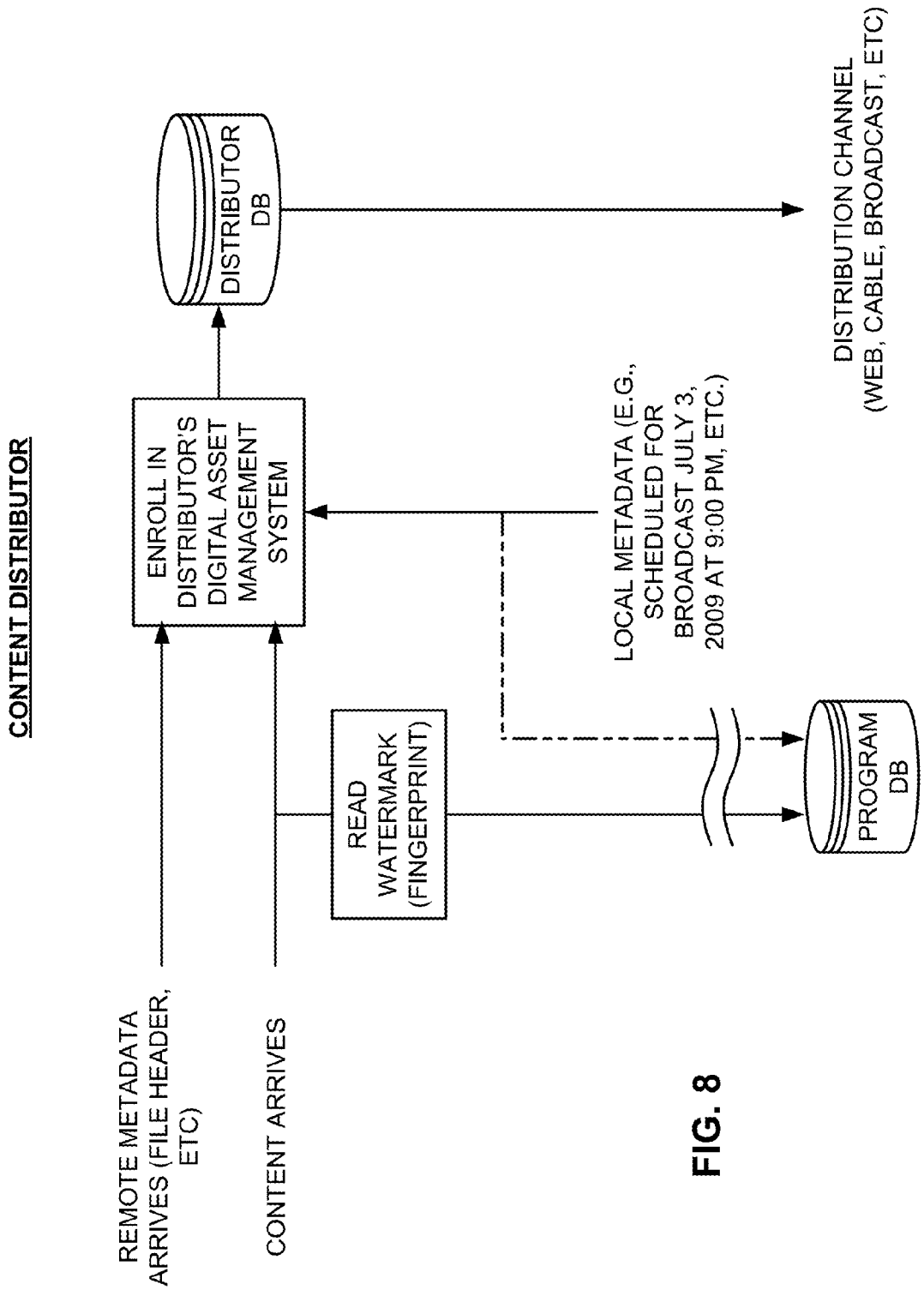

FIG. 8 further details the system from the content distributor's viewpoint (e.g., that of a television network, such as CBS). Content arrives from the movie studio at the distributor's content ingest server, accompanied by metadata. The metadata (which is typically "out-of-band" information, such as header data, or an accompanying file) details the content title, synopsis, running time, format particulars, file size, release date, etc. Both the content and the metadata are enrolled in the network's internal digital asset management system ("checked-in").

The network adds its own metadata to the digital asset management system in association with the checked-in content, detailing internal administrative information, including when the content is scheduled for broadcast, when it is scheduled for posting on the web, internal identifiers, etc.

In compliance with a contractual requirement with the content creator (e.g., as part of a distribution agreement), as part of the check-in process, the content distributor sends at least some of the metadata it authored and stored in its internal database—including schedule information—to the Program Directory Database, where it is stored in association with the content.

Similarly, the content distributor can be contractually required to electronically update the Program Directory Database when there is any change to the earlier-provided information, or when new scheduling information becomes available (e.g., additional air dates, when the content is scheduled to be removed from the web, etc.).

By such an arrangement, the Program Directory Database grows organically, with different parties contributing information as the content is first produced, and then distributed, and then as changes occur. Supplemented with information contributed by monitoring nodes remote from expected content distributors, the Program Directory Database becomes a formidable collection of information about content availability from diverse sources—all compiled automatically. Moreover, it details availability far beyond the week or ten days that are typical with known electronic program guides.

Sometimes a content outlet may receive content but not then know the schedule by which it will be distributed. Nonetheless, the content is detected by a watermark/fingerprint detector at the outlet's content ingest point, and a record of the content as being stored at that outlet (and the date/time of detection) can be entered into the Program Distribution Database.

Such a Program Directory Database can be used in the manners described for EPGs elsewhere in this specification. For example, the database can be consulted by cell phone applications to find—and to schedule the downloading of—desired content. If a user samples a program of interest, a quick check of the database can immediately reveal the many outlets and schedules by which full copies of the program are available. A download of the full program may be made immediately, or scheduled for a later time.

Sometimes a user may encounter (and the user's cell phone may sample) a program seen before—such as a particular episode of a series, such as Friends or House. A software application on the cell phone that identifies the program may summon, from the Program Directory Database or elsewhere, a listing of all episodes in the sampled series, and present the listing (with program synopses) to the user. The user may not be interested in viewing the currently playing episode (since it was watched previously), but may chose to watch, or schedule for later downloading, one or more un-viewed episodes in the series (including both repeated episodes, and episodes not yet aired). Thus, an encounter with a repeated program may prompt a user to arrange for viewing of another episode of the same series. The Program Directory Database facilitates identification and location of such other episode for viewing. (In some embodiments, a file may be compiled identifying all of the episodes of a series downloaded and/or viewed by a user. This can serve as a ready reference to identify un-watched episodes of the series.)

Known user interface paradigms from EPGs can be employed in connection with the presently described Program Directory Database. For example, a user may identify certain programs or genres as Favorites, and such programs may be featured more prominently in a user-customized presentation of the database contents.

Some user interfaces may feature visual icons—or thumbnails—for programs, by which they are iconically represented. Thematically-consistent variants may be employed to represent different forms of content availability, e.g., web-based, streaming, download, pay, high definition, etc. For example, the same basic artwork may be used for all icons for a particular program, with different styles of borders to indicate the different variants. Such icons may be organized in folders corresponding to different programs. A folder for a particular program may also include icons representing auxiliary content that is associated with such program (e.g., information on characters, blooper reels, contests to win studio audience tickets, widgets, etc). As described elsewhere in this specification, the user may be provided an opportunity to submit feedback to the program (e.g., on plot decisions, character actions and motivations, etc); the program folder can include one or more icons that launch applications by which such feedback may be submitted.

Desirably, differently formatted versions of the same content are merged together under a single program entry (e.g., represented as a folder) in the Program Directory Database, as presented to the user. (E.g., unlike present channel-centric EPG displays, a user would not be presented with entirely different entries for the High Definition and Standard Definition counterparts of the same broadcast, such as on ESPN and ESPN-HD.)

In addition to folders for user-defined favorites, the user interface by which contents of the Program Directory Database are presented to the user may include folders for specials, late breaking news, and other programs of potential interest to the user that do not have dedicated folders.

In some implementations, the information in the Program Directory Database is checked on a periodic or ongoing basis, for accuracy. For example, a monitoring service—such as offered by Nielsen—may sample local television channels to confirm that programs are available in accordance with the indicated schedules. If not, the database record can be flagged as possibly in error, and follow-up action can be taken to redress any related mistakes in the directory, and to ensure that similar errors don't recur. Such a monitoring service can likewise check web availability of content. If it finds that particular content is no longer available from a web outlet shown in the Program Directory Database to have such content, the database record can be amended accordingly.

Watermark/fingerprint detectors may be located at other locations in the content distribution workflow—other than at public content outlets. For example, companies that offer transcoding, subtitling, and DVD authoring services may have detectors at their ingest servers—reporting content upon its receipt. These reports may be logged in the Program Directory Database, but access to these reports may be limited to the content's originator (e.g., studio). Alternatively, such detectors may report such content to a private database at the content originator.

In still another variant, users' cell phones can generate content reports that are provided to the Program Directory Database. For example, if a user browsing the internet happens across an episode of Friends from a particular social networking web site, this fact may be reported to the Program Directory Database, and the web site can be added as an alternative outlet for the content (if not already listed). Likewise, if a user samples a television broadcast (which may be watermark-encoded with a source ID and timestamp, as described above), the content may be identified (by watermark or fingerprint), and this information reported to the Program Directory Database to check the database accuracy, and/or for audience survey purposes.

Immersive Content

In recent years television programming has shifted from the "lean-back" passive entertainment of decades past to the "lean-forward" entertainment that almost invites viewers to shout at the TV, such as Jerry Springer's combative offerings.

Some emerging technologies offer the promise of 3D television, hoping to further engage viewers. However, practical problems with the user experience, such as prompting headaches, and triggering epileptic seizures, may limit the practical prospects for such physically immersive experiences.

Better, it seems to the present applicants, are technologies that allow greater user immersion without the disorientation that attends 3D and other virtual reality experiences.

In accordance with this aspect of the present technology, users are invited to engage with the characters, plot and environment of television and other content programs in a participatory manner, typically through a user interface provided by an associated cell phone application.

In one particular arrangement, aspects of the program are influenced by the audience—either collectively or individually. For example, users may opt to expose certain personal profile information from their phone to the originator or distributor of the content. If a particular program is thereby found to have a viewership with an unusually large percentage of truck owners (or wine drinkers), then truck companies (or wine brands) may be accorded differential treatment in the program's production and/or advertising sponsors—shaping the content or commercial offerings to correspond to the audience. In some instances the adaptation can occur in nearly real-time, such as by advertising being inserted dynamically based on current context—just as Google's AdWords tailor ads to accompany web search results. In other arrangements, the audience profile information is provided to the program's writers, and is used to adapt the plot and/or other program features in accordance with the users' profile information.

If a program has a high percentage of Budweiser beer drinkers, Miller Brewing Company may be willing to pay a premium ad rate to be promoted during such a program.

Television and online content may take a lesson from massively multiplayer online role-playing games (MMORPGs) such as World of Warcraft, in which teams of players ("Guilds") have collective sets of talents, tools, and other assets, which determine the teams' successes and failures. Likewise with an audience for entertainment content. The composition and attributes of the audience collectively can be used to influence the content's plot, the characters' motivations and successes/failures, the advertising, etc.

Different viewers may ally themselves with different characters in a program's cast. For example, in the program Friends, some viewers may enter information through the cell phone's user interface identifying themselves with Phoebe, others with Monica, others with Chandler, others with Ross, etc. Each program character may act, in some respects, as a proxy for the corresponding segment of the viewing audience. The audience can offer suggestions, advice, decisions, etc., which may influence the way the character responds, or other twists and turns of the plot. (The audience may urge Chandler that he is not ready to propose marriage to Monica.)

In one particular arrangement, a program may be originally produced with several alternate plot paths (akin to the Choose Your own Adventure series of children's books). Depending on audience sentiment expressed through their cell phones, the plot may proceed in different ways (e.g., by playing one of plural different recorded segments for different portions of the program).

In another arrangement, audience feedback is provided to the program's producers, who tailor writing of forthcoming episodes in accordance with such feedback.

Sometimes the audience is given the opportunity to judge different program characters. In the program The Mole, for example, a cast of characters works to achieve a shared goal, but includes a double-agent saboteur—trying to foil the group, who needs to conceal his identity. At the end of each episode the audience can be polled for their assessment of who is the mole. The character with the least number of audience votes can then be removed from the cast for the next episode.

In still another arrangement, characters in reality and other live action shows are literally informed of viewer feedback, clues, motivation, or instructions, and tailor their actions accordingly. A live comedy show may take user-submitted ideas or dilemmas as the bases for improvisational comedy sketches, which are performed after giving the comedy troop a few minutes to put together their skit.

Great Broadway actors tell of their sense of being responsive to the particular audience in attendance at each performance. Comedians such as Lily Tomlin conspicuously adapt their acts to the particular audience before which they are performing. Although the cell phone interface does not provide quite the immediacy or intimacy of a live audience, it still allows a great step forward in enabling a performance to be adapted to the viewing audience. (With accelerometers, magnetometers, multi-touch user interface capabilities, etc., cell phones offer far richer capabilities to provide feedback than other devices available in the past, e.g., television remote controls.) New hybrids of electronic content can thereby be realized, incorporating both scripted aspects, and aspects dependent on the viewing audience.

On-the-fly adaptation of program plot and content to reflect user feedback is becoming easier as more programming becomes wholly synthetic. That is, for programs produced with animated computer generated imagery, rather than live actors and physical sets, the plot can be dynamically configured based on real-time audience suggestions. (E.g., a Chandler-like character may miss the subway train on his way to propose marriage to a Monica-like character—delaying his arrival until after she's left for the evening—all in accordance with a CGI script adapted per audience suggestion. Or an action character can reach for either a sword or his left hip, or a mace on his right, depending on the direction that most of the audience members move their cell phones.) While popular animated Pixar productions take great lengths of time to animate and render, the lower resolutions needed for productions to be presented on televisions and cell phone screens—together with the continued exponential growth of processing power per Moore's Law, makes audience-responsive animation and rendering possible.

In some arrangements, a program may include one or more avatars whose actions and/or motivations are established in accordance with input from the whole audience, or a portion. (E.g., content featuring a Civil War battle may include an avatar hero in the Confederate Army, responsive to input from viewers in the Confederate states, and an avatar hero in the Union Army, responsive to input from the northern states.)

(Reference has been made to controlling motivations. A single motivation may dictate a large set of consequent actions. Thus, if a hero's motivation is to rescue the damsel, even at the price of his own life, then numerous actions in the ensuing scenes may logically follow. If the hero's motivation is instead to vanquish the opponent and live to tell about it, then a different set of actions may logically follow. Depending on circumstance, receiving audience input as to character motivation may be preferable to receiving audience input as to individual actions.)

Names and/or locations of participating audience members can be submitted together with their content input. The program can incorporate such names into the story line. (E.g., on arriving at Monica's apartment, Chandler may note "I rode up the elevator with a guy named Tony, visiting from Portland, who said he could see my aura, and said it looked disturbed. Do you think my aura looks disturbed?") Subplots may unfold based on the input of audience participants.

If audience avatars are included in a program, they may be given the names most common among participating audience members—increasing audience affinity to the content. Or an avatar name may be assigned otherwise, such as the name of a first viewer to correctly respond to a question, etc. Or instead of naming the avatar after an audience member, an audience member who wins a competition may be granted the privilege of assigning the avatar a name of his/her choosing.

A plot may be scripted to include rhetorical questions, or questions between characters, to which the audience can also respond. ("I don't know if I should wear this red dress for my date tomorrow with Chandler; maybe it's too forward.") Depending on the audience response, she may or may not choose to wear the red dress (and may credit advice given by a "Tony" for her decision).

In some cases, viewers may submit voiced (audio) instructions or other audio input. Such audio input may be incorporated into the soundtrack of the content—further increasing viewer involvement. (The soundtrack to a mob scene may comprise dozens or hundreds of superimposed audio tracks, submitted by audience members using their cell phones.)

Naturally, audience members whose suggestions are adopted in the story as it unfolds (or whose audio is incorporated) will take pride in their involvement—giving them some bragging rights in water cooler discussions at the office, etc.

In accordance with another aspect of the present technology, cell phones may be used to signal the "thumbs-up" or "thumbs-down" that were used to indicate gladiators' fates in ancient Rome. However, instead of the Emperor passing judgment, it is the collective audience.

The "thumbs-up" or "thumbs-down" signals may be entered by various user interface controls, by shaking the phone while right-side-up, or by shaking it while inverted, or by other gestures or actions.

If an audience signals approval for a first game show contestant, and disapproval for a second, the show's producers may increase the first contestant's likelihood of winning.

Gestural use of a cell phone to signal input to an unfolding plot can be used to good effect in large audiences, such as in a theatrical auditorium screening of an action movie. The audience can be invited to thrust and jab, as with a sword, to help a hero defeat an on-screen villain. Again, the battle can unfold with different outcomes, depending on the participation of the audience (e.g., by selecting one of two earlier-produced different endings, or by animating different computer graphics sequences that are that are rendered on the fly).

In still another aspect, mobile phones are used as input devices at live performance venues, such as concerts. The audience can use the cell phones to tell the performers what songs they want played, and suggest encore tunes. The concert promoter may publish a software application for submitting such input, and may require that users provide their email addresses (and optionally other demographic data) in order to activate the capability. By so doing, of course, the promoter gains a valuable marketing resource. The glow of cell phone screens from concert audiences may replace the glow of lighter flames to signal audience affinity for the concert performer.

In still another aspect, the features just-described (e.g., providing user input to content programming) may be complemented by data going the other way, i.e., from the content program to the users' cell phones. The content may include watermark or other encoded data that triggers a synchronized action by the user's cell phone. This can include the various forms of auxiliary content detailed in this application and those incorporated by reference. An interplay may take place, in which user input triggers responsive action in the content, which in turn triggers responsive action in the auxiliary content, and back and forth.

By arrangements such as the foregoing, users may involve themselves in content as it unfolds, with their actions and views influencing program actions and plot twists. Instead of the passive, lean-back viewing of decades past, or the shout-at-the-TV viewing invited by some current programming, viewers are granted control of the programming in unprecedented manners—through gestural or other interaction with their mobile phones, yielding more fully-engaging, immersive experiences.

Screen Switching

In accordance with a still further aspect of the present technology, users are provided straight-forward means for switching content from the small screen (e.g., a cell phone) to a nearby big screen (e.g., television display), or vice versa.

In one form, this means comprises a user interface control that sends instructions to the destination screen, by which it can continue the user experience presently underway on the current screen (e.g., rendering of entertainment content, etc.). For web content, such as a video download from YouTube, the cell phone can send a pointer to the web site, together with state data for the video player application, e.g., detailing the current point in the video and buffered content. For a video game, the cell phone can similarly send current state information to the processor in the television computer—allowing it to resume from the current state.

In some implementations, the transfer may be effected using the Bonjour protocol—advising the receiving processor of the information available for transfer, and inviting the receiving processor to take over.

In some instances, rather than "push" the content from the present screen onto a different device screen, the destination device can communicate with the currently-playing device, to "pull" the content.

In other applications, the originally displayed content may be under the control of a Java application, such as a BDJ application provided with a Blu-ray disc, or a Tru2Way application provided by a cable company's interactive service. Such content can be provided to another screen by loading a counterpart Java application on the receiving computer, and initializing its execution state in accordance with the execution state of the originating computer at the moment of the requested transfer.

One such Java application is a program that allows viewers to play along with game shows, such as Who Wants to Be a Millionaire (in which a contestant elects how many questions to answer for doubled- or nothing-stakes), or Deal or No Deal (in which a contestant chooses a box with an unknown cash prize, from a set of boxes whose cash prizes are collectively known; the contents of other boxes are then successively revealed, indicating—by the process of elimination—prizes that are not in the chosen box; a banker offers the contestant an alternative cash deal whose value fluctuates as the process of elimination continues).

A viewer watching such a content program can elect to receive a Java counterpart of the game (e.g., as auxiliary content—using arrangements described elsewhere in this specification). The Java version is loaded (and periodically updated) with the particular parameters of the episode being played. At any point in the episode the viewer can pause the regular presentation of the game, and try playing the game to the end with the Java application. The viewer can then compare his or her results with that of the televised contestant.

(The original content program may be paused automatically when the Java version of the game is activated. Pausing may comprise a TiVo pause operation, which buffers ongoing content delivery on a local or remote disc. Or the original game may be delivered in an on-demand mode from a cable or online source, and pausing can be achieved simply by instructing the downloaded stream to stop, and resume later.)

As another example, consider a person playing World of Warcraft on a home PC, who wants to continue the game while riding a bus. By operation of a content-transfer user interface control on the user's cell phone, state information about the game is transferred to the phone (together with game software, if not already present) and the player can resume action on the small screen.

Consider also a person playing a game or watching content on a big screen, whose cell phone receives content (e.g., images) send by a friend. To better view the received content, the user may operate a control on the cell phone interface (or on the big screen interface) to automatically pause the big screen content, and display instead the information sent to the cell phone. After reviewing the images on the big screen, the user may invoke a messaging application—still on the big screen—to respond with comments back to the friend. With another operation of the UI control, the big screen then resumes the original content presentation.

Users may want to use the big screen for many such operations, such as viewing pictures and videos, video messaging, reading, control/set-up, etc. The big screen becomes an extension of the cell phone's user interface. Content delivered to cell phones can be authored with this capability in mind, e.g., integrating a Screen Transfer button into the user interface that controls the content.

In this and other of the detailed arrangements, screen switching can be facilitated by utilizing cloud resources for most of the associated processing (e.g., game play, user interface operation, etc.). The cloud resource receives user input from UI controls on big- and small-screen devices, and dynamically produces responsive MPEG streams that are sent to destination devices and rendered to the user. The user issuing a command on, e.g., a cell phone, quickly sees a responsive screen display—as if the cell phone is responding to the user command. In fact, it is the cloud processing that is responding; the user is simply watching a video of a remotely-authored response. By performing processing in the cloud, and using the cell phone (or big screen processor) simply as an input-output peripheral, switching screens becomes easy. The MPEG stream authored in the cloud, responsive to user input, is simply routed to a desired local device.

Returning to the World of Warcraft game, the user controls the program as is customary. However, the user's input is sent to the cloud processor, which interacts with the game and feeds a responsive MPEG stream back to the user's PC. When the user wants to take the game onto the bus, the destination for the remotely computed MPEG stream is simply switched to the user's cell phone.

In the case of viewing pictures (e.g. JPEG images) sent by a friend to the user's cell phone, the JPEG imagery is decompressed and presented as frames of video sent to the cell phone. A single picture is continuously rendered until the user operates a user interface control to advance to the next picture. This command is relayed to the cloud processor, which then presents the next picture as a series of video frames. When the user wants to switch to the big display for viewing, the MPEG stream is simply re-routed to the desired display.

By such arrangements, users can switch between small- and big-screen presentations of content, and—if desired—may interrupt the usual linear unfolding of entertainment content by electing to become actively involved in content-related activities.

Additional Information

Google recently announced Google Voice, which offers a number of improvements to traditional telephone systems. Vonage and Skype also offer advanced telephony features. Such features can be used in conjunction with application of the present technology.

For example, such a service can establish rules governing how the user's phone may be employed to convey media reminders. The service can be arranged to permit delivery of television program reminders to the user only between the hours of 8 pm and 10 pm on Monday-Thursday, and between 9 am and 11 pm on Friday-Sunday, but not if the user's current location is determined to be at a movie theatre or at work, etc.

Other features of Google Voice can be employed as well. One is locating the user. If a user sets Google Voice to ring phones at her office, residence, and beach house, and the user answers a call on the beach house phone, location data for the user is thereby generated. This information can be used with the location-based services detailed herein (as well as other location-based services).

The voice to text transcription services offered by Google Voice can be employed to transcribe the audio of primary or auxiliary content to text, which can be provided to the user by known arrangements (email, SMS texting, FAX, etc.). For some usage scenarios, text is a better form of data than audio, as the user can skim or study different parts depending on their interest.

Privacy concerns arise whenever user information is involved. Naturally, any implementation of the present technology should pay appropriate regard to protecting user privacy. In some arrangements the user is given the opportunity to share more or less information, thereby increasing or decreasing functionality of the different systems detailed.

Devices other than cell phones can be used in connection with the described arrangements. In some embodiments, information and content is routed directly to such devices. In others, a cell phone receives the data, and relays it to other devices (e.g., nearby devices, or devices associated with a common network), such as by WiFi, Bluetooth or Bonjour.

The user's profile data can include data indicating a subset of the television programming universe of interest (or not of interest) to the user. In one embodiment, this profile data takes the form of channels in the EPG (or programs in the Program Directory Database) that are to be included or excluded. (ESPN may be "in," Home Shopping Network may be "out.") Profile data for a user can also indicate social groups of which the user is a member, such as a fantasy football league or a Facebook group. Not just the fact of membership, but additional information about the group, its membership, and its activities, can be used to help identify primary and auxiliary content of potential interest. (If a user's fantasy football team includes players from four NFL teams, the user may be interested in receiving text alerts from the home TiVo system whenever any of those four teams plays.)

Although little has been said about advertisers, they doubtless will have a role to play. One is serving in the traditional role of an underwriting sponsor for programming. Another is as a provider of auxiliary content, including applications.

Consider a pizza chain that offers a discount application downloadable from the Apple iPhone App store. The application provides a $10 discount off a $20 pizza order when a viewer has watched certain content sponsored by the pizza chain. The cell phone senses the rendering of the sponsored content to the viewer—qualifying the viewer for the discount. Since the cell phone knows the user's location, it can identify the nearest branch of the pizza store, send a viewing confirmation to that store, and arrange for payment and delivery.

Certain embodiments of the present technology make use of inferences. Inferences can have probabilistic results: e.g., a system may conclude there is a 60% chance the user is watching the Seahawks game, and a 40% chance the user is watching the Trailblazers games. Choices for auxiliary content can be similarly weighted. For example, three of five options presented to the user by a menu of second screen content may relate to Seahawks or football; two of the five may relate to Trailblazers or basketball.

In some embodiments, determinations about a user's viewing activity—at home and away—are tracked and collected in a data store, e.g., a disk or memory connected to a user's home network, or maintained by a service provider, such as Nielsen, Google, or Comcast. This data store can be a hub about which auxiliary content determinations for the user are made. In some arrangements, information about auxiliary content chosen by the user can also be included. This collected data can serve as a source for profile data, and to help discern the user's activities in future contexts that may otherwise be ambiguous.

With appropriate permissions, such information may be shared—in real time, or occasionally—with content providers and other parties, so that they can offer tailored auxiliary content for that user's consumption. In some embodiments the information is shared only with the entities involved in delivering particular content to the user. For example, information about the user's viewing of ESPN programming may be shared only with ESPN. In other embodiments the information is shared with a broader class of entities. This latter arrangement, for example, can allow CBS, NBC, ABC and FOX to offer auxiliary content corresponding to an ESPN football game.

(Such collected information may also be shared with audience measurement enterprises.)

Different networks may all have different strategies for the second screen. Fox, NBC, ESPN may all have different auxiliary content for similar primary content.

While the specification discusses estimating a program that the user may be watching (or may watch in the future), several programs can be similarly estimated. If the user is asked for confirmation, she may identify one of several as being watched.

While this specification earlier noted its relation to the assignee's previous patent filings, it bears repeating. These disclosures should be read in concert and construed as a whole. Applicants intend that features in each be combined with features in the others. Thus, for example, arrangements employing widget-related technology as detailed in application 61/150,235 may be implemented to also include features and arrangements detailed in the present application—and vice versa. Audio sampling an airport television monitor to trigger a DVR back home to record the same or a preceding program, as detailed in application Ser. No. 12/271,772 (reproduced in the Appendix, below), can likewise query a crowd-sourced database to identify related auxiliary content as detailed in the present specification. Pushing various auxiliary content to a cell phone through which a user can scroll with arrow keys, as detailed in application Ser. No. 12/484,115 (published as US20100048242), can be employed in systems using the present application's circumstance-based guess about the content to which the user is currently being exposed, as detailed in the present application. The referral of some content recognition tasks, or component tasks, to outside service providers—possibly on a reverse auction basis, as detailed in application Ser. No. 12/484,115—can similarly be employed in embodiments of the presently-described technology. Etc, etc. Thus, it should be understood that the methods, elements and concepts disclosed in the present application be combined with the methods, elements and concepts detailed in those related applications. While some have been particularly detailed in the present specification, many have not—due to the large number of permutations and combinations. However, implementation of all such combinations is straightforward to the artisan from the provided teachings.

DVRs are usually home-based devices. But they need not be so. Embodiments of the present technology can use all manner of recording devices—wherever located. (Cablevision is offering a consumer DVR service where the actual recording is done at a head-end in a cable distribution system.)

While FIG. 1 shows the second screen auxiliary content as being conveyed separately than the primary content, in other arrangements they can be conveyed together, or using the same distribution system.

In some implementations, the user's proximity to other people can be used in estimating the user's activity. For example, if the user is in proximity to buddies from an after-work basketball league, this factor may make it more likely that the user is watching a basketball game (if the month is March) or a football game (if the month is November). In contrast, if the user is in proximity with his wife, and it is a Monday-Thursday evening, this factor may suggest that the user is watching the Daily Show on Comedy Central. Proximity can be sensed electronically, e.g., by Bluetooth signals, by comparison of location data, etc.

As indicated, the meaning of physical proximity depends on the requirements of a particular implementation. Physically proximate can mean within a certain distance (e.g., 10 yards, or 100 yards), within a common dwelling, within line of sight, served by a common network, within range of a short range wireless service like WiFi or Bluetooth, etc.—depending on the application.

The specification refers to television programs. But this is a shorthand that is meant to encompass any video content—regardless of how produced or delivered. For example, a television program can be a traditional program—distributed simultaneously across multiple different networks to plural consumers. Or it can be content distributed using other models, such as web casts, YouTube, Hulu, Video on Demand (e.g., Netflix), Boxee, DVD, theatrical presentations, etc.

Looking forward, content programmers may create libraries of enhanced media experiences, each customized to individual users, comprising a basic content theme (e.g., a basketball game) in which complementary experiences (auxiliary content) are dynamically selected by and navigated by the user. The paradigm of a television screen and a cell phone may be eclipsed by more immersive rendering systems and by more capable user interfaces. One user may choose a Howard Cosell avatar to narrate a Jets football game, and may engage the avatar in interactive spoken dialog to clarify particular points. Another may simply chose sideline commentary by a graying Joe Namath.

Reference was made to a Program Directory Database. Once the data is compiled by the detailed automated techniques, it can be presented, used and disseminated according to techniques discussed elsewhere in this specification in connection with EPGs, and otherwise—as known from existing EPG prior art. Prior art EPG technologies are not detailed in this specification; the reader is referred to the existing literature for further information. (This literature includes Davis et al U.S. Pat. Nos. 5,559,548, 5,576,755, 5,585,866, 5,589,892, 5,635,978, 5,781,246, 5,822,123, 5,986,650, 6,016,141, 6,141,488, 6,275,268, 6,275,648, 6,331,877, 6,418,556, 6,604,240, and 6,771,317, and U.S. Pat. No. 7,263,202 to the present inventors concerning use of watermarking in connection with EPGs.)

While the present technology is described in the context of providing auxiliary content to complement primary video content, the same principles are applicable elsewhere, e.g., in other devices that respond to circumstances and/or their environment. Thus, for example, auxiliary content can be associated with any object, including physical objects. A user taking a picture of the Eiffel Tower, or a carton of milk, may be presented with a menu of associated content using principles detailed herein.

It will be recognizing that certain of the above-detailed arrangements are specialized cases of a larger concept—technologies that help present content responsive to a user's environment.

Some researchers foresee the day when all of our daily experiences are captured in digital form. Indeed, Gordon Bell at Microsoft has compiled a digital archive of his recent existence through his technologies CyberAll, SenseCam and MyLifeBits. Included Bell's archive are recordings of all telephone calls, video of daily life, captures of all TV and radio consumed, archive of all web pages visited, map data of all places visited, polysomnograms for his sleep apnea, etc., etc., etc. (For further information see, e.g., Bell, A Digital Life, Scientific American, March, 2007; Gemmell, MyLifeBits: a personal database for everything, Microsoft Research Technical Report MSR-TR-2006-23; Gemmell, Passive Capture and Ensuing Issues for a Personal Lifetime Store, Proceedings of The First ACM Workshop on Continuous Archival and Retrieval of Personal Experiences (CARPE '04), pp. 48-55; Wilkinson, Remember This, The New Yorker, May 27, 2007. See also the other references cited at Gordon's Bell's Microsoft Research web page, and the ACM Special Interest Group web page for CARPE (Capture, Archival & Retrieval of Personal Experiences) web page.)

A more practical example is a cell phone that captures aspects of a user's daily experiences through frequent sampling of audio (e.g., five thousand samples per second, continuously; or ten thousand samples per second for sequences of twelve seconds every minute, etc.). These samples can be sent to the user's home for further query at the user's explicit request, or they may accompany the user and provide data on which other operations can be based.

Consider a user who hears a song of interest while at a restaurant. At a later time she physically or wirelessly links her cell phone with her laptop, which runs the Google Toolbar. (Or the cell phone may itself run the Google Toolbar.) While the Google Toolbar maintains a history of past searches, the cell phone provides a history of past experiences. Using a user interface for this task provided by the Google Toolbar, the user quickly navigates through audio samples from the day (e.g., by timestamp, GPS location tag, etc.) and finds the sample taken at the restaurant. The Google Toolbar processes the identified audio and returns metadata for the song, such as title name, artist and album. However, unlike competing services (such as Shazam), the sampled history allows the user to mine past experiences—in some cases investigating captured information that didn't become of interest until later.

In another arrangement all of the sampled audio is provided to Google (as it is captured, or later). Google initiates searches, and annotates the audio data with (or otherwise provides) results, such as metadata; speech-to-text data; links to Wikipedia and other web resources corresponding to audibly discernible words—and concepts abstracted from the words by NLP, etc. When the user later reviews the audio data, this enhancement information is immediately available.

Crowdsourcing, and location data can be employed to good effect. For example, Google may identify a dozen other patrons who were in the restaurant at the same time as the user, by reference to GPS data and timestamps. Audio captured by those patrons can be considered in conjunction with audio captured by the user, to more completely characterize the user's audio environment (e.g., an uninterrupted stream of audio may be assembled from the occasional audio samples captured by the different phones). Google can analyze this augmented patchwork of audio to yield more and/or better information, and make this information available to users, e.g., in accordance with the respective time period that each was in the restaurant.

In another implementation, Google may make available results from analysis of other patrons' audio data—either searches that the patrons expressly requested, or analyses that Google conducted autonomously. If a person at the next table ordered a chocolate soufflé, Google's search of the term—which it recognized and combined with the restaurant name in one of its data mining efforts—may reveal the restaurant's recipe for that dessert as published in Gourmet magazine three years ago. Such information may be included among the results presented to the user, even though it was based on audio captured at another patron's table. In like fashion, the restaurant's menu may be reconstructed from the repeatedly-spoken entrée names—contextually recognized by the analysis software (e.g., as following the audio clue "May I take your order?") and made available to all users known—by GPS data—to have visited the restaurant (whether or not they captured audio there).

In still other arrangements, captured audio is fed to Google continuously, and analyzed immediately. Google streams the results of its analyses back to the users' cell phones, where they are buffered for review. (Some analyses may take longer than others, so the returning data flow may not be strictly chronological, but the returning data may each be associated with a timestamp indicating the excerpt of audio to which it corresponds, so the information can be presented in appropriate order.) At any point a user can scroll back through their experience (perhaps using a user interface suited for temporally arranged data, such as the "cover flow" interface used by Apple in the iPod and detailed in its patent publication 20080174570) to examine captured information, and to review corresponding information returned by Google.

(In the arrangements just-detailed, the fact that the patrons are in a common environment (i.e., the restaurant) can be ascertained by looking up their respective latitude/longitude coordinates in a geolocation database, such as the GeoPlanet service noted above. To a low level of functional granularity, e.g., to the level of street address or business name, the patrons' latitude/longitude coordinates all correspond to the same location.)

Various references have been made to Bonjour. Bonjour is Apple's trade name for its implementation of Zeroconf—a service discovery protocol. Bonjour locates devices on a local network, and identifies services that each offers, using multicast Domain Name System service records. This software is built into the Apple MAC OS X operating system, and is also included in the Apple "Remote" application for the iPhone, where it is used to establish connections to iTunes libraries via WiFi. (TiVo uses Bonjour to locate digital video recorders and shared media libraries.)

Bonjour services are implemented at the application level largely using standard TCP/IP calls, rather than in the operating system. Apple has made the source code of the Bonjour multicast DNS responder—the core component of service discovery—available as a Darwin open source project. The project provides source code to build the responder daemon for a wide range of platforms, including Mac OS X, Linux, *BSD, Solaris, and Windows. In addition, Apple provides a user-installable set of services called Bonjour for Windows, as well as Java libraries.

As indicated, Bonjour can be employed to serve various functions in implementations of the present technology. For example, a DVR can use Bonjour to periodically (e.g., every second or every several seconds) send out on a home network subnet one or more packets identifying the programming it is currently rendering (or recording), and identifying auxiliary content corresponding to that programming. It may also identify its own location, its registered user(s), and functions/services it offers, as well as detailing other programming choices that are currently available according to EPG data, and according to listings of previous recordings. These Bonjour broadcasts all include the DVR's IP address, so that responding systems can request from the DVR further information or content. Likewise, a cell phone can similarly transmit information identifying its status, the content it is rendering, its location, its available functions/services, profile data of the user, etc.

Other software can alternatively, or additionally, be used to exchange data between devices. Examples include Universal Plug and Play (UPnP) and its successor Devices Profile for Web Services (DPWS). These are other protocols implementing zero configuration networking services, through which devices can connect, identify themselves, advertise available capabilities to other devices, share content, etc.

The artisan is presumed to be familiar with such software tools.

It will be recognized that certain embodiments of the present technology allow plural viewers to have individual viewing experiences on individual screens, without interfering with a collective group viewing experience on a shared screen. The net result is an enhanced social experience, in which the individuals can contribute different perspectives to a robust group experience.

Concluding Notes

Having described and illustrated the principles of our inventive work with reference to illustrative examples, it will be recognized that the technology is not so limited.

For example, while reference has been made to cell phones, it will be recognized that this technology finds utility with all manner of devices—both portable and fixed. PDAs, organizers, portable music players, desktop computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones.

(Details of the iPhone, including its touch interface, are provided in Apple's published patent application 20080174570.)

For expository convenience, concepts noted in this specification are usually described singly. However, these concepts can be combined in nearly unlimited combinations (including concepts detailed in the incorporated-by-reference documents), e.g., so that a cell phone or system can employ multiple of the described features detailed. Such combinations expressly fall within the disclosure of this application.

While the specification and drawings describe data as being stored in certain devices, this is illustrative only. Data can be stored anywhere (even in "cloud" storage), and made available whenever and wherever needed. Similarly, various operations are described as being performed by particular devices. However, processing too can be performed anywhere, and results made available wherever needed. Thus, references to a cell phone performing an operation, or data being stored in a DVR, are illustrative only. Other arrangements can of course be used.

The present assignee has published a great deal of information about related systems and technologies in the patent literature—a body of work with which the artisan is presumed to be familiar. Included are U.S. Pat. Nos. 6,590,996, 6,947,571, and published patent application 20070156726.

While certain arrangements employ watermark technologies for content identification or signaling, the same or similar functionality can often be realized with fingerprint-based approaches, or out-of-band technologies (e.g., VBI signaling). In some implementations, bar coding or other overt symbologies, RFID chips, and other identification technologies may be employed.

Although disclosed as complete systems, subcombinations of the detailed arrangements are also separately contemplated.

While this specification has detailed particular ordering of acts and particular combinations of elements, in the illustrative embodiments, it will be recognized that other contemplated methods may re-order acts (possibly omitting some and adding others), and other contemplated combinations may omit some elements and add others, etc.

The design of cell phones and other devices referenced in this disclosure is familiar to the artisan. As indicated above, each typically includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), interconnections between these elements (e.g., buses), and one or more interfaces for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc).

The processes and system components detailed in this specification may be implemented as instructions for computing devices, such as instructions for a variety of general purpose programmable processors including microprocessors (e.g., the ARM series of 32-bit RISC processors), graphics processing units (GPUs), digital signal processors (e.g., the Texas Instruments TMS320 series of devices), etc. These instructions may be implemented as software, firmware, etc. These instructions can also be implemented in various forms of processor circuitry, including programmable logic devices, FPGAs (e.g., the Xilinx Virtex series devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices. References to "processors" or "modules" should be understood to refer to functionality, rather than requiring a particular form of implementation.

Software instructions for implementing the detailed functionality can be readily authored by artisans from the descriptions provided herein, e.g., written in C, C++, Visual Basic, Java, Python, Tcl, Perl, Scheme, Ruby, etc. Cell phones, DVRs and other devices according to the present technology can include software modules for performing the different functions and acts.

Typically, each device includes operating system software that provides interfaces to hardware devices and general purpose functions, and also includes application software which can be selectively invoked to perform particular tasks desired by a user. Known browser software, communications software, and media processing software can be adapted for many of the uses detailed herein. Software is commonly stored as instructions in one or more data structures conveyed by tangible media, such as magnetic or optical discs, memory cards, ROM, etc. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a remote server, different tasks can be performed exclusively by one device or the other, or execution can be distributed between the devices. Identifying content is but one example of such a task. Thus, it should be understood that description of an operation as being performed by a device is not limiting but exemplary; performance of the operation by another device, or shared between devices, is also contemplated.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in a task).

It will be recognized that the detailed processing of content signals (e.g., image signals, audio signals, etc.) includes the transformation of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed in various ways and for various purposes during processing, producing various data structure representations of the signals and related information. In turn, the data structure signals in memory are transformed for manipulation during searching, sorting, reading, writing and retrieval. The signals are also transformed for capture, transfer, storage, and output via display or audio transducer (e.g., speakers).

Reference was made to GPS data. This should be understood as a short-hand for any location-related information; it need not be derived from the Global Positioning System constellation of satellites. For example, another technology that is suitable for generating location data relies on radio signals that are that commonly exchanged between devices (e.g., WiFi, cellular, etc.). Given several communicating devices, the signals themselves—and the imperfect digital clock signals that control them—form a reference system from which both highly accurate time and position can be abstracted. Such technology is detailed in laid-open international patent publication WO08/073347. The artisan will be familiar with several other location-estimating techniques, including those based on time of arrival techniques, and those based on locations of broadcast radio and television towers (as offered by Rosum) and WiFi nodes (as offered by Skyhook Wireless, and employed in the iPhone), etc.

While geolocation data commonly comprises latitude and longitude data, it may alternatively comprise more, less, or different data. For example, it may include orientation information, such as compass direction provided by a magnetometer, or inclination information provided by gyroscopic or other sensors. It may also include elevation information, such as provided by digital altimeter systems.

Reference was made to touchscreen interfaces—a form of gesture interface. Another form of gesture interface that can be used in embodiments of the present technology operates by sensing movement of a cell phone—by tracking movement of features within captured imagery. Further information on such gestural interfaces is detailed in Digimarc's U.S. Pat. No. 6,947,571.

As noted, watermark technology can be used in various embodiments. Technology for encoding/decoding watermarks is detailed, e.g., in Digimarc's U.S. Pat. Nos. 6,614,914, 6,590,996 and 6,122,403; in Nielsen's U.S. Pat. Nos. 6,968,564 and 7,006,555; and in Arbitron's U.S. Pat. Nos. 5,450,490, 5,764,763, 6,862,355, and 6,845,360.

Digimarc has various other patent filings relevant to the present subject matter. See, e.g., patent publications 20070156726, 20080049971, and 20070266252, and pending application Ser. No. 12/125,840 by Sharma et al, filed May 22, 2008.

Content fingerprinting can also be used in various embodiments. Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Audible), and U.S. Pat. Nos. 6,990,453 and 7,359,889 (both Shazam). Examples of image/video fingerprinting are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC).

The figures are meant to be exemplary and not limiting. For example, they sometimes show multiple databases, when a single can be used (and vice-versa). Likewise, some links between the depicted blocks are not shown—for clarity's sake.

Contextual data can be used throughout the detailed embodiments to further enhance operation. For example, a process may depend on whether the originating device is a cell phone or another type of device; whether the ambient temperature is 30 or 80; the location of, and other information characterizing the user; etc.

It is impossible to expressly catalog the myriad variations and combinations of the technology described herein. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure without unduly lengthening this specification, applicants incorporate by reference the documents and patent disclosures referenced in this specification. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

The particular combinations of elements and features in the above-detailed embodiments are exemplary only; the interchanging and substitution of these teachings with other teachings in this and the incorporated-by-reference documents are also expressly contemplated and intended.

A few of the arrangements particularly contemplated by applicants include:

A. A method comprising the acts:
accessing location data indicating a location of a cell phone;
accessing profile data relating to television viewing preferences of a user of the cell phone; and
by reference to at least the location and profile data, making an estimate of particular video content the user may currently be watching, or may watch in the future.

Method A that includes presenting supplemental information to the user from the cell phone, the supplemental information being related to the estimated video content.

Method A that further includes inquiring, through a UI of the cell phone, whether the user is watching the particular video content.

Method A1 that includes, if the user responds affirmatively, providing supplemental information to the user from the cell phone, the supplemental information being related to the particular program.

Method A2 wherein the user views the supplemental information on a screen of the cell phone, while also viewing the particular video content on a screen of a television.

Method A2 wherein the user views the supplemental information on a screen of the cell phone without also viewing the particular video content on a screen of a television.

Method A that includes obtaining EPG data identifying plural television programs currently available in a media market encompassing the indicated location, and assessing the identified television programs in light of the profile data to estimate a particular television program that the user may currently be watching, or may watch in the future.

Method A wherein the profile data includes data related to a previous television viewing history of the user.

Method A that includes accessing the location data from a location module of the cell phone, and making the estimate of the particular television program using a processor in the cell phone.

Method A that further includes sending information about the estimate to a device in a home network associated with the user.

B. A method comprising the acts:
accessing location data indicating a location of a cell phone;
accessing profile data relating to television viewing preferences of a user of the cell phone;
by reference to at least the location and profile data, identifying one or more upcoming television programs that the user may want to view; and
alerting the user to the upcoming television program(s) using the cell phone.

C. A method comprising the acts:
determining that a television and a cell phone are in relative proximity;
accessing profile data relating to television viewing preferences of a user of the cell phone; and
based on the foregoing, employing a user interface of the cell phone to provide supplemental information to the user relating to television programming.

Method C that includes:
inquiring, through a user interface of the cell phone, whether the user is watching the identified television program; and
if the user responds affirmatively, providing the supplemental information.

Method C in which the determining makes reference to location data about a location of the cell phone.

Method C in which the determining makes reference to location data about a location of the television.

Method C in which the determining makes reference to audio or image information captured by the cell phone.

D. A method comprising the acts:
by reference to user profile information, and EPG data, estimating a user's television viewing activity;
using a cell phone to sense audio or image data from a user environment; and
reassessing the estimate based on the sensed data.

Method D in which the estimating includes estimating one or more television programs that the user may be watching.

Method D in which the estimating includes estimating whether the user is watching a particular television program.

Method D that includes reassessing the estimate repeatedly over time.

E. A method comprising the acts:
accessing user profile data;
accessing EPG data;
sensing audio or image data from a user environment; and
by reference to the foregoing data, estimating a television program that the user may be watching.

Method E that includes:
inquiring, through a user interface of a portable device, whether the user is watching the estimated television program; and
if the user responds affirmatively, providing to the portable device supplemental information relating to the television program.

F. A method comprising the acts:
programming a DVR to record a television program; and
in advance of a scheduled time for the program, sending a reminder to a cell phone associated with the DVR.

F1. Method F that includes determining that the cell phone is remote from a home geography, determining when the program is available in that remote geography, and sending the reminder in advance of the program availability in the remote geography.

G. A method comprising the acts:
programming a DVR to record a television program;
sending to a cell phone associated with the DVR a reminder related to the television program; and
in response to a user command entered through a UI of the cell phone, presenting at least part of the television program on a screen of the cell phone.

H. A method involving a cell phone and a television system, comprising the acts:
identifying an upcoming television program of interest to a user, using an electronic user interface associated with the television system; and
sending to a user's cell phone a reminder related to the television program.

Method H that further includes, in response to a user command entered through a user interface of the cell phone, presenting at least part of the television program on a screen of the cell phone.

Method H that includes sending at least part of the television program to one or more other cell phones with which the user has an association.

Method H that includes sending at least part of the television program to said other cell phone(s) by wireless, such as WiFi or Bluetooth.

Method H that includes sending at least part of the television program to one or more other cell phones that are physically proximate to the user's cell phone.

Method H that includes sending at least part of the television program to one or more other cell phones that are registered in association with the user's cell phone.

J. A method involving a user's cell phone, comprising the acts:
identifying a television program in which the user is or may be interested; and
inquiring, through a UI of the cell phone, whether the user is watching the identified television program.

Method J that includes, if the user responds affirmatively, providing to the cell phone supplemental information relating to the identified program.

Method J that further includes sensing audio or image data using the cell phone, and inferring from said data if the user has stopped watching the identified television program.

Method J that includes sensing movement of the cell phone, and inferring from the sensed audio or image data, and the sensed movement, that the user has moved away from the television.

Method J1 that includes pausing the television display, so that the program can be resumed when the user returns.

K. A method comprising the acts:
estimating a user's current television viewing activity, by reference to ambiguous data previously available; and
obtaining further, current data to help confirm or refute the estimate, from a user cell phone.

Method K in which the further data comprises user input confirming or refuting the estimate.

Method K in which the further data comprises audio or image data sampled by the cell phone.

Method K that further includes providing, to a user cell phone, auxiliary content related to the estimated television viewing activity.

L. A method involving a user's cell phone, comprising the acts:
before a television program has completed, sensing data suggesting that the user has stopped viewing; and
taking an action related to the television program, to lessen an impact of the user's stopped viewing.

Method L that includes pausing the television display, so that the program can be resumed when the user returns to the television viewing area.

Method L that includes sending information to the user cell phone relating to an excerpt of the television program occurring during the user's absence.

M. A method involving a user's cell phone, comprising the acts:
from a data store associated with a digital video recorder, accessing wireless contact information for the user, and video program data related to the user;
generating an alert notification for the user based at least in part on the video program data; and
transmitting the alert notification to the user, employing the wireless contact information.

Method M wherein the alert notification includes data permitting the user to watch associated video on a screen of the cell phone.

Method M wherein the alert notification includes data permitting the user to run a software widget related to a video program of interest to the user.

Method M wherein the digital video recorder is coupled to a home network, and the data store is also coupled to the home network.

N. A method involving a user's cell phone, comprising the acts:
presenting a video program on a display screen of a video system;
recalling registration data, the registration data associating together the cell phone and the video system; and by reference to the registration data, transmitting auxiliary content to the cell phone to complement the video program presented on the display screen.

Method N wherein the video system includes user data associated with plural users, the method further including:
discerning which of the plural users is likely watching the presented video; and
transmitting the auxiliary content to a cell phone associated with said discerned user.

Method N wherein:
the user data comprises, for at least one of said users, profile information or video viewing information; and
the discerning comprises assessing information about the video program in light of the user data, to discern which of the users is likely watching the presented video.

Method N that includes sending a message to the cell phone alerting the discerned user of the availability of auxiliary content, prior to transmitting the auxiliary content.

Method N1 wherein the message includes information contributed by a proprietor of the presented video program.

P. A method comprising the acts:
launching a second screen application on a user's cell phone;
determining a logical association between the cell phone and a television system;
as a consequence, presenting second screen auxiliary content on a screen of the cell phone, the second screen auxiliary content being related to content being presented on a screen of the television system.

Method P that includes determining the logical association by checking a data registry, the data registry having information associating the cell phone with the television system.

Method P wherein the content being presented on the screen of the television system was earlier distributed, and was recorded by the television system for time-shifted viewing.

Method P wherein the second screen auxiliary content is also related to a geographical location of the user.

Method P that wherein the second screen auxiliary content is selected based in part on user preference data stored in a memory.

R. A computer readable storage medium having instructions stored thereon causing a user's cell phone to consult with a television system associated with that user, and to present information on a screen of the cell phone, the presented information including a title of a video program being processed by the television system.

Medium R that also includes instructions for receiving auxiliary content data associated with the video program, and presenting the auxiliary content data to the user.

Medium R that also includes instructions for presenting to the user a menu of plural auxiliary content items associated with the video program, and receiving user input indicating which of said plural auxiliary content items should be presented to the user.

S. A method comprising the acts:
identifying, from a list of programming associated with a digital video recorder, a program of interest to a user;
determining that the user is at a first location, remote from a home location; and
sending to a cell phone of the user a reminder about the program of interest.

Method S that also includes determining information about how the user may access the program at the first location, and sending said information to the user at the first location.

Method S1 that includes consulting EPG data corresponding to video available at the first location.

Method S that also includes sending information about auxiliary content to the cell phone, the auxiliary content being related to the program of interest to the user.

T. A method comprising the acts:
presenting video content on a screen of a television system; and
pausing the presentation upon a user pause command;
wherein said user pause command also causes a graphical control to be presented, by which the user can select auxiliary content related to the video content.

Method T wherein the auxiliary content provides background information relating to a subject presented on the television screen at a time of said user pause command.

Method T wherein said graphical control is displayed on the screen of the television system.

Method T wherein said graphical control is displayed on the screen of a user cell phone.

Method T that includes receiving data corresponding to a user selection of auxiliary content, and displaying the auxiliary content on a user cell phone.

U. A method comprising the acts:
presenting dynamic video content on a screen of a television system;
presenting dynamic auxiliary content on a screen of a cell phone, the auxiliary content being related to the video content; and
pausing both presentations upon a single user pause command.

V. A method comprising the acts:
presenting dynamic video content on a screen of a television system; and
sensing that a cell phone has been moved from a rest position towards a use position;
wherein said sensing causes the presentation of the video content on the television system screen to pause.

Method V wherein the sensing comprises sensing that the cell phone has been moved from a rest position when a phone call is incoming.

W. A method comprising:
with a first device, sampling data from plural video content streams;
by reference to the sampled data, identifying three or more of said plural content streams;
by reference to user profile data, identify two or more of the identified content streams as being of potential interest to a user;
presenting excerpts from the two or more streams on a screen of a cell phone, in spatial proximity; and
in response to user selection, presenting one of said two or more streams on the cell phone screen for user viewing.

Method W wherein the first device comprises the user cell phone.

Method W wherein the first device comprises a receiver of modulated RF signals.

X. A method employing a first user's cell phone, comprising the acts:
receiving instruction from a first user, setting an option allowing sharing of visual content information between the first user's cell phone and one or more other cell phones;
presenting visual content on the first user's cell phone;
transmitting content-related data from the first user's cell phone; and
presenting the same visual content on a second user's phone, in synchrony with presentation on the first user's cell phone.

Method X that includes transmitting content-related data from the first user's cell phone to one or more other users' cell phones.

Method X wherein the visual content is presented on the second user's phone in a sub-portion of a display screen.

Method X wherein the transmitted content-related data identifies a remote computer server from which the visual content is obtained by both the first and second users' cell phone.

Method X wherein the transmitted content-related data comprises compressed video data.

Method X wherein said content-related data is transmitted by a data service discovery protocol across a home network, and the first and second cell phones are both coupled to the same home network.

Y. A method including the acts:
determining a user's location by reference to a portable device conveyed by the user;
identifying a television system proximate to the determined user location; and
controlling an aspect of the television system's operation in accordance with profile data corresponding to the user.

Z. A method comprising the acts:
identifying first content being rendered to a user while second, different, content is also being rendered to the user, one of said content comprising entertainment content presented on a television screen, another of said content comprising web content being rendered on a second screen;
storing data relating to the first and second content in association in a database;
thereafter, querying the database with data identifying the first content, to thereby obtain data identifying the second content that is associated therewith.

Method Z that includes associating profile data corresponding to the user with the data relating to the first and second content, wherein the querying comprises querying with profile data of a querying user.

AA. A method comprising the acts:
capturing samples of ambient audio with a first portable device conveyed by a first user;
capturing samples of ambient audio with a second portable device conveyed by a second user;
determining, by reference to location data associated with said devices, that the first and second devices were in a common environment when capturing samples of ambient audio;
combining and analyzing data corresponding to the ambient audio sampled by the first and second portable devices to yield associated first information;
by reference to the first information, obtaining associated second information from a data structure; and
providing at least some of the second information to the first user;
wherein the information provided to the first user is based, at least in part, on ambient audio captured with the second portable device conveyed by the second user.

Method AA wherein the first information comprises data identifying a song, and the second information comprises artist information associated with the identified song.

Method AA wherein the first information comprises one or more words, and the second information comprises results of an internet search based on the first information.

AB. A method comprising the acts:
receiving report data from plural distributed computer nodes, indicating video entertainment content automatically detected through use of digital watermark or fingerprint technology at such node;
from at least certain of said nodes, additionally receiving scheduling data detailing public availability of the detected video entertainment content by one or more content distributors; and
presenting at least certain of said data to a user in the form of a program-centric directory, detailing source and schedules by which user-specified video content can be obtained for viewing.

Method AB, wherein the program centric directory identifies at least two types of outlets from which the user-specified video content can be obtained for viewing, wherein said types of outlets are selected from the group consisting of a television network, a web site, and a peer-to-peer network.

AC. A method comprising the acts:
at a distributor of video entertainment content, receiving video entertainment content from a source thereof;
detecting digital watermark or fingerprint identification data from the received video entertainment content;
by reference to the detected identification data, reporting presence of such content at the distributor to a remote program directory database;
also reporting scheduling information to the remote program directory database, the scheduling information specifying a schedule by which the video entertainment content is to be made available to the public;
wherein such reports allow automatic compilation of a program directory database usable by the public to identify sources and schedules for obtaining video entertainment content.

AD. A data structure, stored on a tangible storage medium, the data structure causing a processor configured by appropriate programming instructions to produce a content directory, the content directory detailing a title of video entertainment content, and a plurality of sources from which said content can be obtained, the directory further detailing schedule information detailing temporal availability of such content, wherein information from said directory is used to obtain video entertainment content from one of the sources for presentation to a user on a display screen.

AE. A method of transferring video game content from a first screen to a second screen, wherein one of said screens forms part of a user cell phone, the first screen has a first processor associated therewith, and the second screen has a second processor associated therewith, the method comprising the acts:
executing video game software on a remote processor—distinct from the first and second processors;
converting output from execution of said video game software into a video stream;
transmitting the video stream to the first processor, for display on the first screen;
receiving user input at the first processor relating to game play, and transmitting same to the remote processor for responsive action; and
in response to user instruction, changing a destination for the transmitted video stream from the first processor to the second processor;
wherein the user can transfer game play between a cell phone screen and a different screen, during play of a game.

AF. A system for transferring video entertainment content from a first screen to a second screen, the system including a cell phone including one of said screens and an associated processor, the system further including a second processor associated with the second screen, the system further comprising a memory containing instructions for configuring one of said processors to present a user interface control that can be activated by a user to initiate transfer of video entertainment content from the first screen to the second screen, the system further including means, responsive to said user interface control, for transferring the video entertainment content from the first screen to the second screen.

AG. A method of involving a user in video entertainment content, comprising the acts:
presenting video entertainment content to the user;
receiving user input, submitted through a user cell phone; and
adapting the video entertainment content in accordance with said received user input.

Method AG, wherein the user input comprises audio.

Method AG, wherein the user input comprises audio, and the video entertainment content is adapted by including at least a portion of said audio in said content.

Method AG, wherein the user input comprises gestural input issued by user movement of the cell phone.

Apparatuses and systems practicing the foregoing methods, e.g., by use of processors and modules for performing the enumerated acts.

Discs, memories, and other tangible media storing instructions causing one or more computer devices to perform the foregoing methods.

In view of the large variety of implementations to which the disclosed technologies can be put, it should be understood that the particularly detailed arrangements are exemplary only, and not should be understood as limiting the scope of the claimed technology. Rather, we claim all such variations in form and function as may fall within the scope of the following claims, and equivalents thereto.

APPENDIX

The following text is taken from priority application Ser. No. 12/271,772 (with the figure numbers amended to avoid conflict with those referenced above).

BACKGROUND AND INTRODUCTION TO THE TECHNOLOGY

Digital video recorders, such as produced by TiVo, are popular because they allow consumers to watch desired programming at desired times. Programming interfaces for such devices now extend to the web and mobile phones—permitting users to remotely set shows for recording. However, such arrangements are still somewhat limited in their functionality and convenience.

In addition to TiVo, a great variety of other technologies are available to help consumers enjoy entertainment content at times and places of the consumers' choosing (e.g., Apple's iPhones, streaming video, etc.). However, these technologies also suffer from a variety of limitations.

The present technology seeks to eliminate certain shortcomings of these existing technologies, and to provide new features not previously contemplated.

Consider a business traveler who learns that his favorite sports team is playing a game during his travels, and wants the game recorded on his home TiVo. Existing web- and cell phone-based programming interfaces allow the user to search for the program in the TiVo program guide by title (or by actor/director, keyword, or category), and instruct the DVR to record.

Sometimes, however, the user doesn't learn of the program until it is underway. In this circumstance, the user may try to hurriedly perform a search for the program on his cell phone, and then instruct the home DVR to start recording. However, he may find this procedure unduly time consuming, and the rushed keyboard data entry both tedious and error-prone.

Sometimes the user doesn't know the correct title of the program, or doesn't guess the correct words by which the program is indexed in TiVo's electronic program guide. In other instances the user is engaged in another activity, and is not able to devote himself to the search/programming tasks with the concentration required.

At best, inception of the DVR recording is delayed; at worst no recording is made.

Consider another example—the traveler is speaking on the cell phone with his daughter when he notices a television documentary of interest (something about the Panama Canal). After concluding his telephone conversation he is disappointed to find that the documentary is ended—he didn't catch its name.

Consider yet another example. The traveler enters the airport lounge in the final seconds of a football game—just after a game-winning touchdown. He wishes he could have seen the end of the game—or at least the post-game highlights—but his flight is about to board. Again, he's left with nothing.

These and other scenarios are addressed by embodiments of the technology detailed herein.

Instead of identifying programs using text-based search, certain embodiments of the present technology identify programs by their audio or video content. That is, a cell phone or other such device serves as a media "forager"—employing its microphone or camera to capture some of the media content in the user's environment, and then use this captured data to automatically identify the content. Once identified, a great number of operations can be performed.

The foregoing and other features and advantages of embodiments of the present technology will be more readily apparent from the following detailed description, which proceeds with reference to the accompanying drawings.

OVERVIEW

Consider the example of the traveler who sees part of a television show of interest in an airport lounge. In accordance with one aspect of the present technology the traveler launches a "media forager" mode on his cell phone, which causes the phone's camera or microphone to sample an excerpt of imagery or audio from the television. From the sampled excerpt, the phone—or a remote system, derives an identifier (e.g., it decodes a digital watermark, or computes a fingerprint). This derived identifier is then used to query a database to learn the identity of the television program.

Once the program has been identified by the database, the cell phone can instruct a digital video recorder (e.g., at the traveler's home) to immediately start recording a remainder of the program.

Alternatively, or in addition, an electronic program guide (EPG) can be searched for instances when the identified program will be available in the future. In this case the DVR can be instructed to record the program in its entirety at the future date/time.

In still other arrangements, with knowledge of the identity of the sampled program, the cell phone can be used to order delivery of the full program at a later time (e.g., by video on demand), or to request delivery of a disc copy of the program (e.g., by a service such as Netflix).

In addition to identifying the program, the database may have information about programming before and after the sampled excerpt. This additional information enables still further features.

Consider the example of the traveler who wishes—too late—he'd recorded a documentary, after seeing its final moments. In this case the traveler launches the media forager mode, and captures an excerpt of ambient audio from the television. Since the documentary has ended, the audio is now from a Toyota commercial.

The audio excerpt is processed to extract an encoded digital watermark. The watermark indicates the audio was sampled from a KOIN television broadcast, at 9:59:04 pm on Nov. 6, 2008. This information is used to query a database, which gives the lineup of programming transmitted by KOIN television around the time of the sampled excerpt. From the screen of his cell phone the traveler sees that before the Toyota commercial (and before a Miller beer commercial that preceded it), a documentary entitled "How Do They Do It? Navigating the Panama Canal" was aired. With a few more manipulations of his cell phone, the traveler learns that the same show will be broadcast at 3:00 a.m. on a travel channel of his home cable system, and instructs his home DVR to make a recording.

In some arrangements, programming is delivered directly to the cell phone. Consider the traveler who saw only the concluding seconds of a football game in the airport lounge. After hearing some of the animated post-game commentary, the traveler decides he'd like to view plays from the game's fourth quarter on his iPhone, while flying.

As before, the traveler uses the phone to capture audio from the television—now airing a Nike commercial. After a bit of processing the iPhone obtains the program lineup around the Nike commercial, and presents it with Apple's "cover flow" user interface. With the touch screen the traveler scrolls backwards and forwards through key frames that represent different segments of the football game and advertising. He highlights four segments of interest, and downloads them from an NFL portal where he has an account. (He also notes a favorite E-Trade commercial—the baby trading stocks, and downloads it too.) After his plane reaches its cruising altitude, he and a seatmate view the downloaded video on the seatback in front of them, using a pocket micro-projector. (This arrangement may be regarded as use of a cell phone as a mobile virtual DVR.)

Other aspects of the present technology allow users to interact with their home television systems through one or more auxiliary screens, such as cell phones and laptops.

In one illustrative arrangement, several roommates are watching the Phillies play a World Series game on television. Two of them activate a "second screen" mode on their cell phones—a process that starts with the phones sampling the ambient sound. Hidden in the broadcast audio is a digital watermark, conveying broadcaster ID and timestamp data, allowing identification of the program being watched. Responsive to this identification, each cell phone user is presented a menu of "second screen" choices related to that program. One elects to view detailed statistics for the at-bat player. The other elects to view streaming MLB video from a camera that focuses on the Phillies manager, Charlie Manuel.

Another roommate has a cell phone with a tiny screen—too small for a second screen experience. But he's brought a laptop for occasional diversion. He activates his phone's "extra screen" mode, which is like the just-described "second screen" mode, but transmits data from the phone to other devices (e.g., the laptop), e.g., by Bluetooth. This data allows the laptop to serve as the second screen. On the laptop this third roommate chooses to join a Yahoo! group of former-Philadelphians, now living in the Seattle area, chatting online about the game.

In the arrangements just-discussed, the cell phone samples television output to identify a television program. In other arrangements, a similar principle is applied to identify the television system itself. That is, the television (or associated equipment, such as a satellite receiver or DVR) subtly modifies program audio (or video) to encode an identifier, such as a TiVo account name. A cell phone discerns this identifier, and—with knowledge of the particular system being watched—control facets of its operation. For example, the cell phone can serve as a second screen on which a user can scroll through existing recordings, delete programs no longer of interest, see what recordings are planned for the day, view a local copy of the electronic program guide, etc. This allows, e.g., one spouse to watch full-screen television, while another browses the listing of recorded programs and performs other operations.

The foregoing examples are provided as an overview of some of the many embodiments possible with the present technology. As will be apparent, this is just a sample of a much larger collection of embodiments that are possible and contemplated.

DETAILED DESCRIPTION

Figure 9:
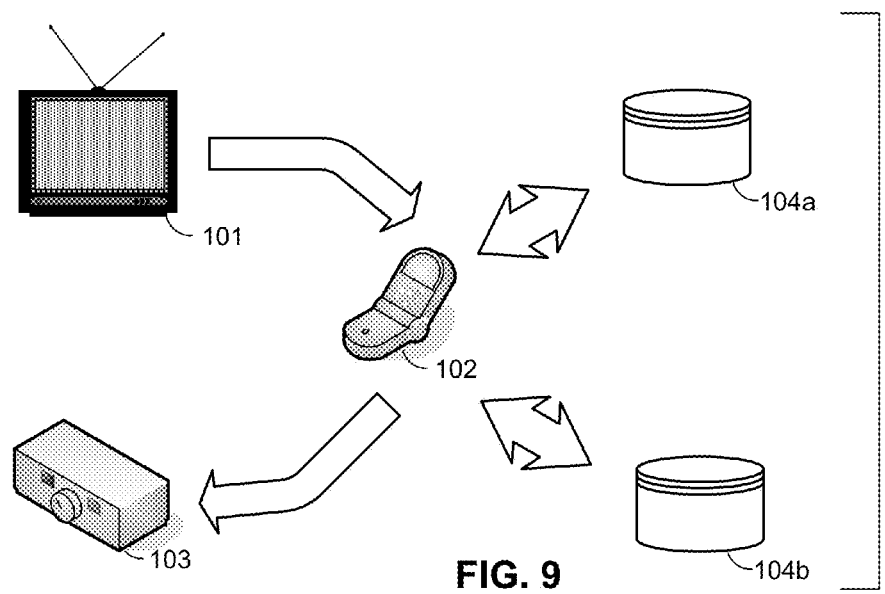
FIG. 9 is a depiction of further embodiment of the present technology.

Referring to FIG. 9, a first aspect of the present technology employs a television 101, a cell phone device 102, a digital video recorder (DVR) 103, and one or more databases 104*a*, 104*b*.

Briefly, a user operates the cell phone to capture ambient content (e.g., audio) from the television. Plural-bit auxiliary information earlier encoded into the audio as a steganographic digital watermark is decoded, and used to query a database. In response, information is returned to the cell phone and presented to the user—identifying the television program to which the captured audio corresponds.

The user can then operate the cell phone to instruct DVR 103 to start recording a remaining portion of the identified program. However, this yields just a partial recording. To obtain a full recording, an electronic program guide database is searched to determine whether the identified program is scheduled for rebroadcast at a future time. If so, the DVR can be programmed to record the full program at that future time.

This particular method is shown in the flowchart of FIG. 10.

Cell phone device 102 can be of any format or variety, and includes conventional components. Among these are a display, a wireless transmitter and receiver, and a user interface. The device is controlled by a microprocessor that executes operating system programs, and optionally application programs, read from a memory. It also includes one or more sensors for capturing input from the environment ("foraging").

The term cell phone as used in this disclosure is meant as a shorthand for any portable multi-function device, including not just cellular telephone devices, such as the Apple iPhone and the Google-standardized Android (e.g., the T-Mobile G1), but also portable digital assistants (PDAs) and portable music players (iPods), etc.

The sensor on the device can comprise a microphone for capturing sound. Alternatively, or additionally, the sensor can comprise a 2D optical sensor and a lens arrangement—permitting the device to capture imagery and/or video.

Traditionally, the user interfaces on such devices have comprised plural buttons. Increasingly, however, "touch" interfaces are growing more popular. The iTouch interface introduced by Apple in its iPhone and iPod products is disclosed, e.g., in patent publication 20080174570.

As noted, in a particular embodiment generally shown by FIG. 9, the cell phone 102 captures ambient audio output from a speaker of television 101. This audio bears a digital watermark signal that was inserted by a local broadcaster (e.g., KOIN television), prior to its over-the-air transmission. (Watermarks can be inserted by many other parties, as detailed below.)

In the exemplary arrangement, the watermark repetitively conveys two items of information: a source ID, and a time stamp. The source ID is a bit string that uniquely identifies KOIN television as the source of the content. The time stamp is an incrementing clock that gives the date and time of the broadcast. (More particularly, the source ID has two parts. The first generally identifies the network from which the content is distributed, e.g., CBS, ESPN; the second identifies the local outlet, e.g., KOIN television, Comcast cable-West Portland, etc. The time clock increments in intervals of a few seconds.)

The encoders that insert watermarks in television audio are part of an existing network employed by The Nielsen Company to help track television consumption. Nielsen maintains a database that details the program lineup for each channel in each geographic market and national network, by date and time. This database is fed by program guide information compiled by vendors such as Tribune Media Company and/or TV Guide (Macrovision). To identify a program from a watermark, the watermark ID/time stamp are input as a query to the database, and the database returns output data identifying the program that was airing on that television source at that time.

A conceptual depiction of part of this database is shown in FIG. 11. As can be seen, records are indexed by source codes and time codes. Each record identifies the television content that was being distributed by that content source, at the instant indicated by the time code. The identification of programs can take various forms. One is textual, and can comprise the title of the program (e.g., The Sopranos), optionally with other descriptors, such as episode number, episode title, episode synopsis, genre, actors, etc. An XML format can be used when expressing this information, so that different items of information can be readily parsed by computers processing this data. Sample XML descriptors can comprise, e.g., <ProgramName>The Sopranos</ProgramName>
<EpisodeNumber>42</EpisodeNumber>
<EpisodeTitle>Denial, Anger, Acceptance</EpisodeTitle>

Another way of identifying television content is by numeric identifiers. One such identifier is the International Standard Audiovisual Number (ISAN), which is ISO Standard ISO 15706. An exemplary ISAN identifier for an item of audiovisual content is:

ISAN 0000-3BAB-9352-0000-G-0000-0000-Q (Commercials and other miscellaneous audiovisual content can be identified in the same manner as traditional "programs." In this disclosure, the term "program" is meant to include commercials, etc.)

Because Nielsen has deployed a network of watermark encoders throughout the US national television system, its form of watermark encoding is the natural choice for use with the present technology. Nielsen's watermark is understood to follow the teachings of its U.S. Pat. Nos. 7,006,555 and 6,968,564. Equipment for embedding and decoding the Nielsen watermarks is available from Norpak Corporation and Wegener Corporation.

In other embodiments, other watermark technologies can be used. Arbitron, for example, is understood to use teachings from its U.S. Pat. Nos. 5,450,490, 5,764,763, 6,871,180, 6,862,355, and 6,845,360 in its audience survey technology.

Once the cell phone captures audio from the television, the encoded audio watermark can be decoded by software in the cell phone. (The software is configured to decode the Nielsen form of watermark, per its cited patents.) The cell phone can process a fixed-length sample of audio (e.g., 12 seconds), or the decoder can process incoming audio until a confidence metric associated with the decoded watermark exceeds a threshold (e.g., 99.9%). Alternatively, the cell phone can send captured audio to a remote server for watermark decoding.

In a hybrid arrangement the decoding task is distributed. The cell phone performs one or more preprocessing operations, and sends the preprocessed data to a remote server for final watermark decoding.

The preprocessing can comprise spectral filtering—limiting the audio spectrum to only those bands where the watermark is expected to be found. Another form of preprocessing is to sample the audio at a sample rate for which the server-based detector is optimized. Still another form of pre-processing is to subtract a short-term temporal average of a signal from its instantaneous value, or a corresponding operation in the frequency domain. This is sometimes termed median filtering. (See, e.g., the present assignee's U.S. Pat. Nos. 6,724,914, 6,631,198 and 6,483,927.) Yet another form of pre-processing is Fourier domain filtering. Other operations include compressing the audio in the temporal or frequency domain. For additional information on such processing, see pending application Ser. No. 12/125,840 by Sharma et al, filed May 22, 2008. In addition to other benefits, such pre-processing can anonymize other ambient audio—which might otherwise be personally identifiable.

The cell phone can stream the preprocessed data to the remote server as it becomes available, or the cell phone can package the preprocessed data into a file format (e.g., a *.WAV file), and transmit the formatted data.

(If the Nielsen watermark is used, the encoded source ID will be consistent throughout the sampled excerpt. The timestamp information will likely be mostly consistent through the sampled excerpt (e.g., usually differing only in the second, or minute). Synchronization information included in the watermark also repeats. Because of such elements of redundancy, data from several successive blocks of sampled audio may be combined—with the consistent watermark information thereby being relatively easier to decode from the host audio. Related technology is detailed in the just-cited application Ser. No. 12/125,840.)

Once the audio watermark has been decoded, it is used to look-up a corresponding record in the database 104a, to determine the television program corresponding to that source ID/timestamp data. Information from the database identifying the sampled program is sent to the cell phone 102, and presented to the user on the cell phone screen (e.g., by title, episode number, and network source). The user then has several options, which may be presented in menu form on the screen of the cell phone.

One is to do nothing further. The user has learned the identity of the program being rendered from the television, and that—alone—may be all the user wants. If the identification is relayed to the cell phone by text messaging or email, the user may archive the message for future reference.

Another option is to instruct a DVR to record the remainder of the program. Since the user knows the exact name of the program, he can use the existing TiVo cell phone or web interface to instruct his DVR to begin recording. Information presented from the database may be copied/pasted into the TiVo search screen to facilitate the process.

Preferable, however, is to automate the task. Software on the cell phone can use TiVo's web application programming interfaces (APIs) to convey the received title (and optionally network) information to TiVo's servers, together with the user's TiVo account information, to quickly instruct the user's TiVo DVR to begin recording the remainder of the program.

As noted, recording only the remaining part of the program may not be satisfactory to the user. At the user's instruction (entered through the user interface of the cell phone), or automatically, a search can be undertaken for rebroadcasts of the same program—whether on the same network or a different one.

One implementation dispatches the program title and other descriptors (e.g., episode number, original broadcast date, etc.) to a database 104b of future programming. (TV Guide makes one such database available to the public on its web site.) The cell phone software can parse the search results received from the database, and present them in menu form on the cell phone screen—allowing the user to choose among perhaps several different instances when the program will be rebroadcast. The user's TiVo DVR can be instructed to record the program at that future date/time, as described above. (The menu may also present the option of a season pass, so that all upcoming new episodes of that program are recorded.)

In another implementation, a separate database 104b is not used. Instead, when database 104a is queried for the program identification (using the watermark-decoded source ID/timestamp data), it also searches its records for future instances of the same program. Such information can be returned to the cell phone together with the program identification. The user is thus immediately informed of whether the program is scheduled for rebroadcast—permitting a more informed decision to be made about whether to record the remaining portion immediately.

Figures 12, 13, 14:
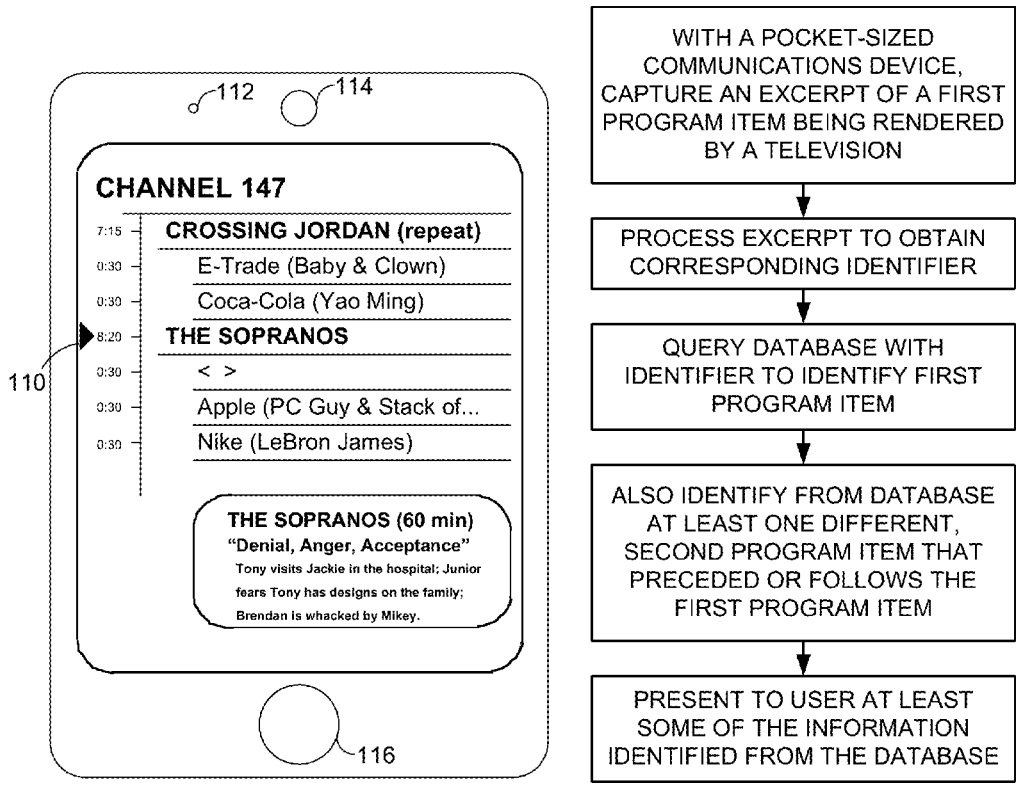
FIG. 12 is a conceptual depiction of search results identifying when a desired program may be available for recording.
FIG. 13 shows one illustrative user interface that can be employed in accordance with embodiments of the present technology.
FIG. 14 is a flow chart detailing an exemplary method that can be used with the arrangement of FIG. 13.

FIG. 12 conceptually illustrates the results of such a search. The user sampled an in-process broadcast of episode 42 of The Sopranos, on the evening of Nov. 5, 2008, on channel 107. A search of upcoming programming (using "Sopranos" and "42" as search parameters) identified three future broadcasts of the same episode: two the next day on the same channel, and one six days later on a different channel. These items are presented to the user on the screen of his cell phone. By touching one of the entries, instructions are sent to TiVo requesting recording of the selected broadcast.

(The user is typically subscribed to a content distribution system, such as cable or DirectTV, which provides a large—but not unlimited—selection of channels. The user's content distribution system can be identified to the database as part of the search procedure (e.g., by data stored in a cookie), so only broadcasts available to the user's DVR are presented in the search results. Alternatively, the search results may be unabridged—encompassing all sources known to the database—and the filtering can be performed by the cell phone, so that only those programs available to the user are displayed.)

Figure 9A:
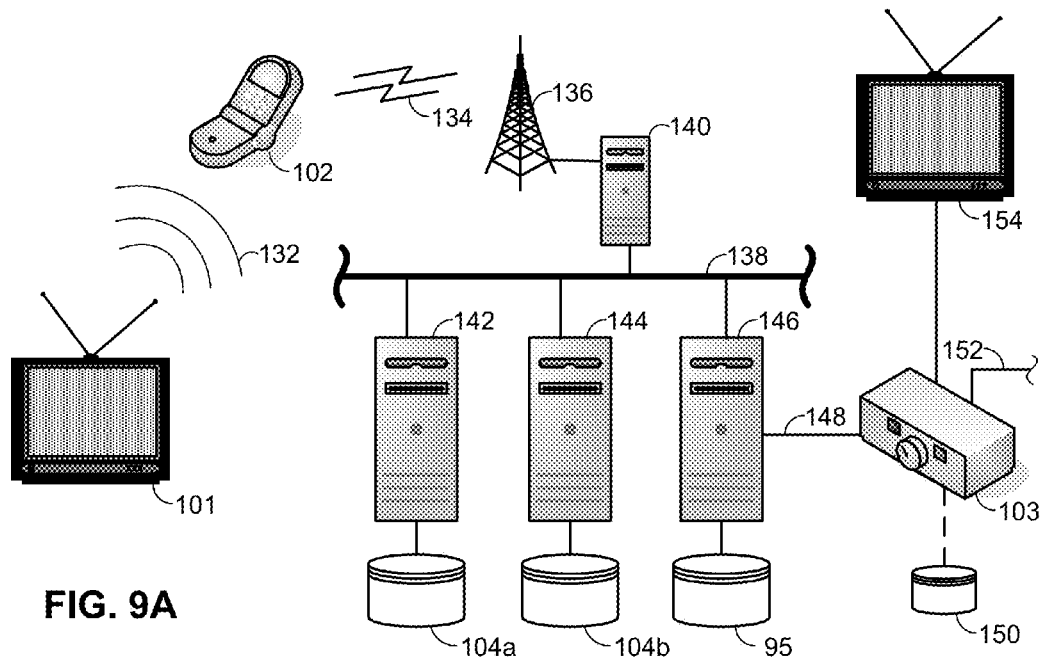
FIG. 9A is a more detailed depiction of an embodiment.

FIG. 9A shows the just-described arrangement in greater detail. Acoustic sound waves 132 emitted by a speaker in television 101 are picked-up and converted to electrical form by a microphone in cell phone 102. Corresponding information is exchanged between the cell phone and a station 136 by radio frequency signals.

The radio frequency transmission can be by various means, depending on the particular implementation. For example, the information can be transmitted during the course of a cellular telephone call, using familiar protocols such as GSM, CDMA, W-CDMA, CDMA2000, or TDMA. Or the information may be conveyed by a wireless data transmission service, such as EV-DO or HSDPA. WiFi, WiMAX, Bluetooth, and other technologies can alternatively be used.

Information received by station 136 is coupled to the internet 138 through a computer 140 (which also performs the reciprocal function of coupling information from the internet to the station 136, for transmission back to the cell phone). As is familiar, countless computers are connected to the internet. Relevant to the present discussion are computers 142, 144 and 146.

Computers 142 and 144 are associated with databases 104a and 104b, and provide their user interfaces, networking functions, etc.

Computer 146 is a server operated by TiVo. Among other functions, it provides data (including EPG data) and administrative instructions to TiVo devices, such as device 103. These services and data can be conveyed to the devices 103 by various means 148, including by phone line, by internet connection and/or by data conveyed with A/V programming distributed by cable or satellite content distribution systems. Computer 146 also presents a web-accessible interface (using various APIs implemented by software in computer 146) through which users—and the present technologies—can remotely exchange data and instructions to/from TiVos.

TiVo device 103 is coupled to a content distribution system 152 by means such as cable or satellite service. Typically included within device 103—but shown separately in FIG. 9A—is a database 150. This database serves as the data structure that maintains schedules of upcoming recordings, listings of existing recordings, electronic program guide data, etc. Device 103 also includes storage on which recordings of television programs are kept, and which buffers programs as they are received (e.g., to permit pausing and rewinding).

While the arrangement detailed above allows a user to learn the identity of a program, and capture same on a home DVR, the system may alternatively or additionally support a variety of other functions.

In one alternative, a user may have privileges associated with several DVRs. For example, Bob may permit his friend Alice to program his DVR, to capture programming that Alice thinks Bob will find interesting. Thus, when Alice uses her cell phone to recognize a program, one of the menu options presented on Alice's phone is to instruct Bob's DVR to record the program (either immediately, or at a future time—as detailed above).

In another alternative, the cell phone may present other information relating to the foraged content. If the program is a sports event, the other information may comprise player statistics, or box score data. If the program is a movie, the other information may comprise information about the actors, or about other programming in which the actors are featured. In many instances, the user may be interested in ordering products depicted in, or related to the content (e.g., a Seahawks jersey, a purse carried by a character, etc.).

Information about such products, and e-commerce sites through which the products can be purchased, can be provided to the users.

A separate database may be used to compile such additional information, or links to such additional information. This database may be indexed by data from databases 104a and/or 104b, and/or by the identifier derived from the foraged content, to identify associated information. Commonly-owned patent application 20070156726 details content metadata directory service technologies that can be used for this purpose.

In many embodiments, the system will identify not just the foraged content, but also related content. For example, if the foraged content is an episode of The Sopranos, the system may present information about different, upcoming episodes. If the foraged content is an NCAA hockey game between Colorado College and the University of Denver, the system may present information about upcoming hockey games involving either Colorado College or the University of Denver. (Or it may present information about upcoming games in any sport involving either of these teams. Or it may present information about upcoming NCAA hockey games, for all teams. Etc.)

The options presented to a user can naturally be customized by reference to information including location, demographics, explicit user preferences, etc. (Through such customization, for example, offers to sell program-related merchandise may be priced differently for different users.)

Collaborative processing may be used to identify other content that may be of interest to the user—based on video preferences of others who are demographically similar, or who are associated with the user (e.g., as "friends" in a social networking site).

Video identified by foraging can also be a source of still imagery for various purposes. Some television images evoke strong emotional responses in certain viewers, e.g., Michael Phelps touching the wall for his eighth gold medal in Beijing; a college team winning a championship game, etc. Users can be given the option of downloading a still image from the identified content, e.g., for use as wallpaper on a cell phone or on a laptop/PC. User interface controls can allow the user to select a desired frame from a video clip, or a representative frame may be pre-identified by the content provider for downloading purposes. (Such wallpaper downloads may be free, or a charge may be assessed—as is sometimes done with ringtones. Metadata associated with the video—or a watermark in the video—can indicate rules applicable to downloading frames as imagery.)

In response to foraged content, the user's cell phone may identify the content and present a menu listing different information and options that may be pursued. A hierarchical approach may be used, with certain menu choices leading to sub-menus, which in turn lead to sub-sub-menus, etc.

Given the decreasing costs of bandwidth and memory, however, an appealing alternative is to push all the information that may be of interest to the user to the cell phone, where it is stored in memory for possible use/review by the user. The user may quickly switch between successive screens of this information by rolling a scroll wheel on the phone, or pushing and holding a button, or by a corresponding gesture on the touch screen, etc. Such an arrangement is further detailed in application Ser. No. 12/271,692, filed Nov. 14, 2008 (published as US20100046842).

In still another alternative arrangement, foraged information is stored for possible later use. This information can comprise the raw sampled content, or the pre-processed content, or information received back by the cell phone in response to foraged content. The information may be stored in the cell phone, or may be stored remotely and be associated with the cell phone (or the user).

This stored information allows the user, in the future, to identify related information that is not presently available. For example, EPG data typically details program lineup information only for the next 10 or 14 days. A user can recall foraged Colorado College hockey information from a month ago, and resubmit it to quickly identify games in the upcoming week.

(In yet other embodiments, the stored information can take the form of an entry in a personal task list (e.g., in Microsoft Outlook), or a posting disseminated to friends by services such as Twitter.)

As noted, the program lineup database can be used to identify other programs—other than the one sampled by the user. For example, it can be used to identify preceding and following programs.

In accordance with another aspect of the present technology, information identifying some of these other programs is presented to the user.

FIGS. 13 and 14 show one such arrangement. The user has sampled ambient audio from a nearby television with an iPhone (or iPod). The watermark from the audio is decoded and used to identify the sampled program, and retrieve information about surrounding programming.

Information from the database is presented in menu form on the screen of the iPhone. The sampled show is indicated by an arrow 110, or other visual effect (e.g., coloring or highlighting). Surrounding programming is also displayed. (Also indicated in FIG. 13 is the iPhone's microphone 112, camera lens 114, and button 116.)

In the detailed arrangement, the display indicates the source that was sampled by the user (Channel 147), and also provides title and synopsis for the sampled episode. Additionally, the display gives the lengths of surrounding program segments.

For example, before the sampled segment of The Sopranos (which is indicated as having a duration of 8 minutes 20 seconds), was a 30 second Coke commercial. Before that was a 30 second E-Trade commercial. Before that was a 7:15 segment of the program Crossing Jordan.

Following the sampled excerpt is a 30 second excerpt that is not identified. This is due to insertion of advertisement by the local broadcast affiliate—not known to the database. The length of the segment window is known, but not its content.

Following is a 30 second Apple advertisement, and a 30 second Nike advertisement.

As discussed earlier, the audio sampled by the user may be from a program segment following the one of interest. For example, the user may have wanted to capture the E-Trade commercial (about a baby stock trader who uses his profits to hire a clown)—but the moment had passed before he sampled the audio. By touching that selection on the display, the user can learn about availability of the commercial. The software conducts a search through various resources, and locates the commercial on YouTube, as video "eJqnitjqpuM." The user can then download the video, or bookmark it for later viewing.

Instead of the tabular listing of FIG. 13, video programming may be presented to the user via the iPhone's "cover flow" user interface. In this embodiment (shown in FIGS. 15-17), different items of video content are represented by panes—each like an album cover. By gestures on the screen, the user can advance forwards or backwards through the panes—reviewing different items of content.

The panes may simply provide textual descriptions for the segments. Date and time, and other information, may be included if desired. Or, if available, the panes may depict key frames from the video (e.g., identified based on scene changes, such as five seconds after each scene change). If the user clicks on a pane, the pane flips over, revealing additional information on the back (e.g., program synopsis, opportunities to purchase merchandise, etc.).

The user interface can permit panes to be selected, and corresponding information to be stored—serving as content bookmarks. When later recalled, these bookmarks provide data by which the user can quickly navigate to desired excerpts of content.

Figure 16:

As shown in FIG. 16, different types of content may be represented differently in the graphical interface. Feature presentations, for example, may have bold borders, while commercials may have modest borders. Different colors or highlighting can be used to similar effect.

Since it is increasingly easy for consumers to skip commercials, the day may soon come where inducements are offered for consumers to view commercials. Commercials for which there is a viewing reward may be highlighted in the interface. If the user selects one or more such commercials for viewing, he may receive a reward—such as a nickel off his next iPhone or TiVo bill for each commercial.

Figure 15:
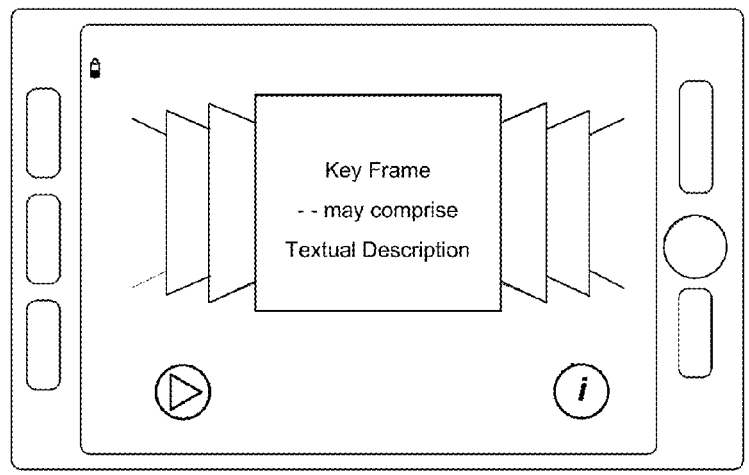
FIGS. 15 and 16 illustrate aspects of a "cover-flow" user interface.

In addition to using the interfaces of FIGS. 14 and 15 for reviewing descriptions of content, they can also be used as navigational tools. For example, the user may download content, and use the interface to select a point from which rendering should begin. Similarly, the user can "rewind" and "fast forward" by selecting different points in a sequence of video segments.

It will be recognized that use of the {source ID/timestamp} watermark detailed above is illustrative only. Other watermarks can be used in other embodiments.

One alternative watermark embeds another form of identifier, such as a unique ID. Again, a database can used to resolve the embedded identifier into associated metadata.

Watermark data can be encoded anywhere in the content distribution chain. Content may be encoded by a rights-holder who originally produced the content (e.g., Disney). Or it may be introduced by the network that distributed the content (such as NBC). Or it may be inserted by a broadcaster who transmitted the program over the air in a given geographic region (e.g., the Nielsen arrangement). Or it may be inserted by a national or regional content distribution service, e.g., using cable or satellite distribution (e.g., Comcast or DirectTV). Etc. Any device or system through which content passes can add a watermark. (The content may convey multiple watermarks by the time it reaches the user. These can co-exist without interference.)

In another embodiment, the sampled content is a promotion (promo) for another item of content. For example, a television advertisement may promote an upcoming television program. Or a talk show guest may tout a soon-to-be-released movie. Or a song on the radio may promote an associated music video. Etc.

In this case, the watermark should allow identification of metadata not simply related to the encoded content (e.g., the advertisement, or talk show program, or song), but also allow identification of the other content to which the sampled content referred (e.g., the upcoming program, the soon-to-be-released movie, or the music video).

FIG. 18 is a flow chart of such an arrangement.

As before, a cell phone is used to capture ambient audio, and watermark information is decoded. A database is queried to obtain metadata relating to the watermark. The metadata may identify the source program, and/or another content item to which it relates (e.g., a movie promoted by an advertisement or a talk show).

A second database query is then performed to determine availability of the desired content (e.g., the movie). The database may be a television electronic program guide, as detailed earlier. Or it may be a listing of movies available for video-on-download from the user's cable service. Or it may be the Netflix database of movies available (or soon-to-be-available) on physical media. Or it may be an index to content on an internet site, such as YouTube, Hulu, etc.

One or more sources of the desired content are presented to the user on the screen of his cell phone. He then selects the desired source. Arrangements are then electronically made to make the desired program available from the desired source. (For example, the user's DVR may record a future broadcast of the movie. Or an order can be placed for the movie on video-on-demand, at a time selected by the user. Or the content can be streamed or downloaded from an online site. Or the movie may be added to the user's Netflix queue. Etc.).

(As in the arrangements earlier described, a single database may be used in this embodiment, instead of two.)

Figure 20:
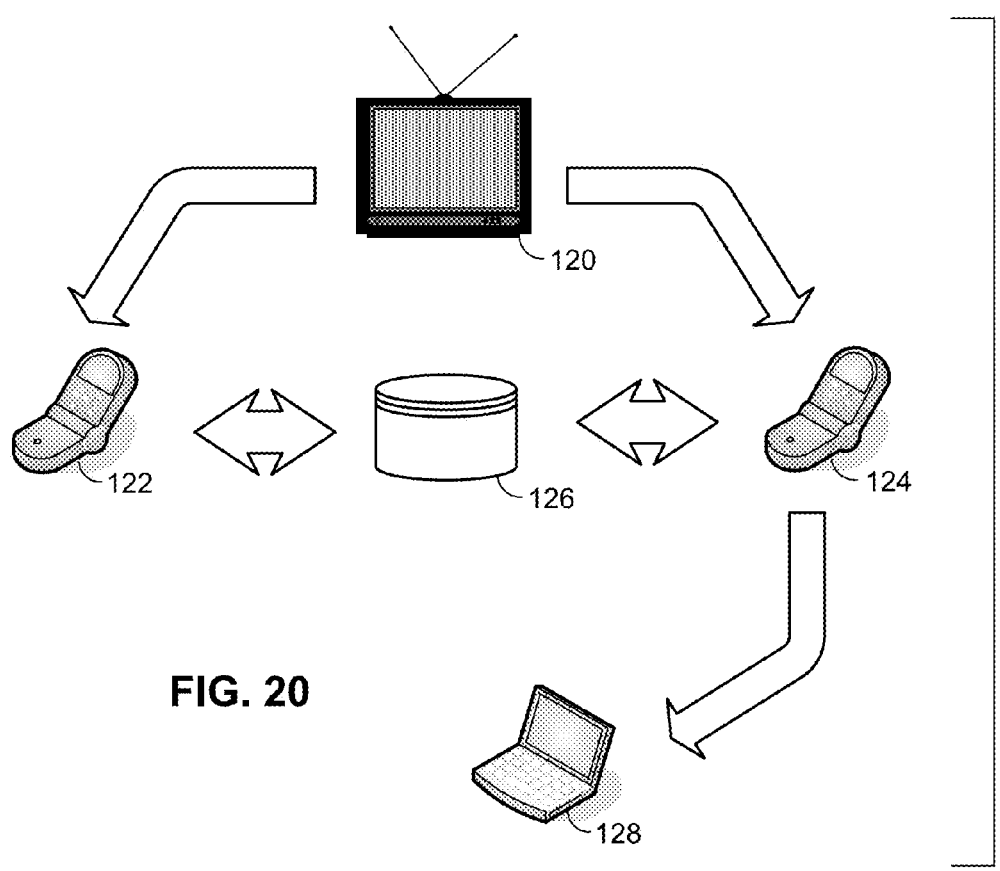
FIG. 20 is a diagram illustrating hardware components that can be used to implement the method detailed in FIG. 19.

Yet another family of embodiments is shown in FIG. 20. In these arrangements, the screen of the television 120 is complemented by one or more other screens, such as on cell phones 122, 124, and/or laptop 128.

In one such embodiment, cell phone 124 is used to capture an audio excerpt of a program being rendered by the television 120. This audio is processed to derive an identifier, which is then used to query a database 126. In response, the database provides identification of the television programming. Through use of this program identifier, information is displayed on the laptop 128 relating to the television program.

In particular, once the identity of the television program is known to the laptop, the laptop can load related content. For a baseball game, for example, it can load statistics, streaming video from cameras focused on certain players, connect to related chat discussions, etc.

In this embodiment, as in the other embodiments disclosed in this specification, the identifier extracted from the sampled content need not be a digital watermark. It can be a content fingerprint instead. Whereas watermarks are formed by subtle but deliberate alterations to content, content fingerprints simply characterize some existing attribute(s) of the content.

One form of audio fingerprinting said to be suitable with ambient audio is disclosed in Google's patent application 20070124756. Another is disclosed in U.S. Pat. Nos. 6,990,453 and 7,359,889 to Shazam. Still other fingerprinting techniques are disclosed in Nielsen's patent publications 20080276265 and 20050232411. (Nielsen maintains a fingerprint database by which it can identify broadcast television by reference to audio fingerprints.)

A drawback to fingerprints, however, is that they must first be calculated and entered into a corresponding database—generally introducing a latency that makes them not-yet-available when content is first broadcast. This is unlike the source ID and timestamp data conveyed by certain watermarks—which are known in advance of broadcast by reference to EPG data, and so are immediately available to identify content the first time it is broadcast.

As before, the processing of the captured content can be performed by the cell phone, or by a remote system. The program identifier returned from the database can go to the cell phone for display to the user, and then be forwarded to the laptop (e.g., by Bluetooth). Alternatively, information sent by the cell phone to the database can include the IP address or other identifier of the laptop, permitting the program identification to be returned directly to the laptop.

A related embodiment (also depicted by FIG. 20) employs the television 120, and two cell phones 122, 124. As before, each cell phone samples content from the television, to derive an identifier. (Or one phone can perform these operations, and transmit the results to the other.) A database 126 is queried with the identifier to identify the television program.

With reference to the program identification, the first cell phone presents a first display of information related to the program being rendered by the television, whereas the second cell phone presents a second, different display of information related to that program.

In another method, a pocket-sized communications device uses its microphone or camera to capture audio or imagery emitted from a television system (which may comprise elements such as a settop box, a DVR, a Blu-ray disc player, a satellite receiver, an AppleTV device, etc.). By reference to the captured data, an identifier is determined. Then, by reference to this identifier, information is presented to a user on a second screen—other than the television system screen—relating to operation of that particular television system.

In this arrangement, the identifier may serve to identify the television system—rather than the content that is being rendered. One way of achieving this is to slightly texture the television screen, so that the texturing imparts a system-identifying watermark to imagery presented on the screen (and captured by the portable device). Or video processing circuitry in the system can slightly modulate the video signal to embed an imperceptible watermark in all displayed video. Or audio processed by the television system can be subtly altered to impose a system-identifying watermark on the output.

Knowing the identity of the particular system, a variety of operations can be performed. For example, the second screen can present program guide information for programming to which the system is subscribed. Or it can 'present listings of programs recorded by that system, or scheduled to be recorded. Other parameters of a DVR portion of the system can similarly be viewed and, if desired, set or altered. (This is performed by issuing instructions over the web, using TiVo's web API, directing the system's TiVo recorder to undertake the requested operations.)

As before, while the output of the television is sampled by a cell phone, a laptop can be used as the "second screen" with which the user thereafter interacts. Or, the screen of the cell phone can be used.

If the identity of the particular system is known (either by foraging the information—as above, or otherwise entered into the device, then content stored in the system's storage (e.g., recorded television programs) may be requested by the cell phone, streamed onto the internet, and rendered by a browser on the cell phone. Real-time broadcasts can also be relayed in this fashion. If the system and the cell phone are equipped to communicate wirelessly, e.g., by Bluetooth, then the cell phone can request the system to transfer the content by that means.

It will be recalled that "interactive television" was much-heralded in past decades, and promised a great variety of user-customized television experiences. While a number of reasons have been offered to explain the market failure of interactive television, the present inventors believe an important factor was trying to overlay too much information on a single screen. By the "second screen" and "other screen" approaches detailed in this specification, interactive television experiences can extend onto screens of cell phones (and laptops)—giving that old technology new potential.

In similar fashion, the large body of technologies concerning electronic program guides can also be extended to cell phone screens. Inventor Davis is named as inventor on a collection of patents detailing EPG systems, including U.S. Pat. Nos. 5,559,548, 5,576,755, 5,585,866, 5,589,892, 5,635,978, 5,781,246, 5,822,123, 5,986,650, 6,016,141, 6,141,488, 6,275,268, 6,275,648, 6,331,877, 6,418,556, 6,604,240, and 6,771,317. Google recently detailed its visions for EPG technology in patent publication 20080271080. Using the arrangements detailed herein, teachings from these other patent documents can be leveraged for use on cell phone devices.

It will be recognized that embodiments such as detailed in this disclosure can provide valuable market intelligence to media companies and advertisers who are interested in determining how media is consumed, who influences whom, etc.

To illustrate, information may be captured from system operation showing that a user sampled audio from episode 42 of The Sopranos, transmitted by WSB in Atlanta at 8 pm on Nov. 5, 2008, and—based on that impression—instructed his home TiVo in Seattle to record the same episode on channel 344 on November 11.

Still more detailed information can be collected when different media outlets tag content to permit their separate identification. For example, YouTube may add its own watermark to videos uploaded to its site, e.g., identifying YouTube, the uploading user and the upload date. The social networking site MySpace may add a watermark when video is downloaded, identifying MySpace and the download date. Etc.

By such arrangements it may be learned, for example, that a user in Tennessee—viewing a YouTube video on November 15—sampled an episode of the program Family Guy, and instructed the DVR of a friend in Toronto to record the episode of that series airing in Toronto the next day. Further data mining may show that the friend in Toronto ordered a season pass to Family Guy on November 17. (The provenance of the YouTube video may also be determined, e.g., it was aired by WNBC in New York on November 2, and was uploaded to YouTube that same evening by a user in zip code 07974—anonymized due to privacy concerns.)

Having described and illustrated the principles of our technology by reference to a variety of embodiments, it will be apparent that the technology is not so limited.

For example, while reference was repeatedly made to sampling audio output from a television, in other embodiments video can be sampled, e.g., using the camera of a cell phone. Watermarks and fingerprints can be derived from the captured image/video data, and used as detailed above.

Similarly, while the disclosure contemplates outputting information to the user on cell phone (or other) display screens, other outputs can be used—such as audible output (e.g., synthesized speech) Likewise, while user input through buttons and touch screens is conventional, other embodiments can respond to spoken voice commands (e.g., through voice recognition technologies).

DVRs are usually home-based devices. But they need not be so. Embodiments of the present technology can use all manner of recording devices—wherever located. (Cablevision is offering a consumer DVR service where the actual recording is done at a head-end in a cable distribution system.)

Although disclosed as complete systems, subcombinations of the detailed arrangements are also separately contemplated. For example, using a cell phone to forage content from a television program, and display information relating to the program on the cell phone screen, can be performed without any subsequent acts (e.g., recording using a DVR).

Little mention has been made of fees for the services detailed above. Naturally, some may be provided free of charge, while fees may be assessed for others. Fees may be billed by the provider of cellular or data services to the cell phone, by the content distribution company that provides content to the DVR, or otherwise. A periodic subscription charge can be levied for some services, or charges can be billed on a per-event basis (e.g., 10 cents to program a DVR based on information gleaned by content foraging). These revenues can be shared between parties, e.g., with part going to TiVo, and part going to the parties that provide the software functionality for the cell phones (e.g., cell phone companies).

It will be recognized that the databases noted above are illustrative only. Many variations in arrangement, and database contents, can naturally be made—depending on circumstances. Similarly with the information relayed to the cell phone or other devices for display/action. E.g., titles alone may be presented, or much richer collections of data can be employed.

The identifiers referenced above, e.g., derived as watermarks, or indexed from databases, may be arbitrary (e.g., the 1DA7 source ID of FIG. 11), or they may have semantic value (e.g., as is the case in the timestamp data, which conveys meaning). In other embodiments, different identifiers can naturally be used.

Some cell phones apply signal processing (e.g., lossy compression) to captured audio that can degrade recognition of foraged content. In next-generation cell phones, the raw audio from the microphone may be made separately available, for use by automated systems like the present technology. Similarly, next-generation phones may always buffer the last, e.g., 10-20 seconds of captured audio. By pressing a dedicated button on the phone's user interface (or activating a feature in a gesture user interface, etc.), the buffered data can be processed and transmitted as detailed above. (The dedicated button avoids the need to otherwise launch the forager software application, e.g., by navigating menus.) Similar arrangements are detailed, in the context of cell phone-captured image data, in application Ser. No. 12/271, 692 (US20100046842), cited above.

While the present disclosure focused on data captured from the ambient environment, e.g., from a sensor that captures audio (or imagery) rendered by a speaker (or presented on a screen), the detailed technology likewise finds applications where the audio (or imagery) is provided in electronic form without use of a sensor or rendering. For example, the functionality detailed herein can be provided in software running on a PC or cell phone, and operative in connection with content delivered to and processed by such device. Or electronic content on a first device can be made available to a second device over a wired (e.g., USB) or wireless (e.g., Bluetooth) link, and processed by the second device in the manners detailed. An example of such an arrangement is content wirelessly transferred to a user's Zune music player, and thereafter downloaded to his computer when the Zune player is docked. When processing of content data is performed in such contexts, additional market intelligence information is available (e.g., concerning the devices and software with which the content was used).

FIG. 13 showed one arrangement for presenting program segment data to users. A great variety of other arrangements can be employed, as is amply shown by the diversity of electronic program guides that have been developed. The presentation of segment lengths, in absolute minutes, is of course illustrative. This information, if desired, can be presented in many other fashions—including graphically, by numeric offsets from the present time, etc.

Depending on the application, information about commercials and other programs may or may not be desired. Modification of the detailed embodiments to include, or exclude, commercials and related data is well within the skill of the artisan.

It will be recognized that the cover flow sequence of FIG. 16 can be adopted to present EPG program data, e.g., showing a series of temporal sequence of programs on a given channel, or a selection of programs available at a given time across set of plural channels.

While reference was made to laptops, it will be understood that this is shorthand for a larger class of devices, including netbooks and tablet computers. The "pocket test" is one possible test: anything that can fit in a pocket may be regarded as a "cell phone." Any larger device that can be run without access to AC power may be regarded as a "laptop."

Similarly, it should be understood that use of the word "broadcast" in this disclosure is not meant to be limited to over-the-air transmission of television signals in a narrow context. Instead, any simultaneous distribution of content to multiple destinations is regarded as a broadcast.

While the detailed embodiments focused on sampling output from televisions, it will be recognized that the detailed media foraging principles are more generally applicable. For example, a consumer may forage for content in a movie theatre, in a nightclub, or anywhere else that audio or imagery may be sampled. Moreover, one cell phone may forage content audibly or visibly rendered by another cell phone.

(While through-the-air capture of content is preferred, principles of the present technology can also be applied on contexts where content is available to a foraging device in another fashion, e.g., by wireless or by wire.)

The present assignee has published a great deal of information about related systems and technologies in the patent literature—a body of work with which the artisan is presumed to be familiar. Included are patents concerning watermarking technologies (e.g., U.S. Pat. Nos. 6,122,403 and 6,590,996), and associating content with related metadata (e.g., U.S. Pat. Nos. 6,122,403, 6,947,571 and 20070156726).

The design of cell phones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), and an interface for communicating with other devices (which may be wireless, as noted above, and/or wired, such as through an Ethernet local area network, a T-1 internet connection, etc.).

The functionality detailed above can be implemented by dedicated hardware, or by processors executing software instructions read from a memory or storage, or by combinations thereof. References to "processors" can refer to functionality, rather than any particular form of implementation. Processors can be dedicated hardware, or software-controlled programmable hardware. Moreover, several such processors can be implemented by a single programmable processor, performing multiple functions.

Software instructions for implementing the detailed functionality can be readily authored by artisans, from the descriptions provided herein.

Typically, each device includes operating system software that provides interfaces to hardware devices and general purpose functions, and also include application software which can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a remote server, different tasks can be performed exclusively by one device or the other, or execution can be distributed between the devices. Extracting watermark or fingerprint data from captured media content is but one example of such a task. Thus, it should be understood that description of an operation as being performed by a device is not limiting but exemplary; performance of the operation by another device, or shared between devices, is also contemplated.

To provide a comprehensive disclosure without unduly lengthening this specification, applicants incorporate by reference the patents, and patents applications referenced above. (Such documents are incorporated in their entireties, even if cited above in connection with specific of their teachings.)

The particular combinations of elements and features in the above-detailed embodiments are exemplary only; the interchanging and substitution of these teachings with other teachings in this and the incorporated-by-reference patents/applications are also expressly contemplated and intended.

The invention claimed is:

1. A method comprising the acts:
transforming data sampled from an audio-visual program content of a first type, rendered by a first device to a user, by a watermark extraction process executing on a hardware processor, to yield watermark payload data, said watermark extraction process including the acts:
discerning a watermark calibration signal in the sampled data;
adjusting the sampled data in accordance with the discerned watermark calibration signal;
extracting a series of raw bits by demodulating the adjusted sample data with a carrier signal, said raw bits redundantly encoding a watermark payload; and
decoding the watermark payload data from the extracted series of raw bits;
submitting said watermark payload data to a database and, in response, obtaining metadata about said audio-visual program content;
using said metadata, identifying plural alternative sources for audio-visual program content of said first type;
selecting between said identified plural alternative sources based on stored rule data; and
arranging for user viewing of the audio-visual program content of said first type, from said selected source.

2. The method of claim 1 in which the stored rule data expresses a preference of the user regarding at least one of: (a) streaming media content vs. downloaded; (b) free content vs. paid; (c) commercials; (d) video resolution; (e) delivery from sources that may be unauthorized; and (f) source.

3. The method of claim 1 that includes searching electronic program guide information using said metadata, to identify said plural sources for the audio-visual program content of the first type, wherein the user needs neither to recognize the rendered audio-visual program content so that it can be located in electronic program guide information, nor select from among said alternative sources, both such acts being performed otherwise.

4. The method of claim 1 in which said arranging act comprises instructing a content recording system to record audio-visual content, so that the user can later view the audio-visual content recorded using said system.

5. The method of claim 1 in which the act of obtaining metadata comprises receiving information corresponding to ambient audio sampled by a user device from the rendered audio-visual program content, said user device being different than the first device, and using the received information—in conjunction with fingerprint or watermark data in a first database—to identify metadata about the rendered audio-visual program content.

6. The method of claim 1 in which the program content of the first type comprises an episode from a program series that includes plural episodes, and the method includes:
using said metadata to identify plural sources for another episode in said series;
selecting between said plural sources for said another episode, based on the stored rule data; and
arranging for the viewer to view said another episode, from said selected source.

7. The method of claim 1 in which the program content of the first type comprises a sports game of a first type, and the method includes:
using said metadata to identify plural sources for another sports game of said first type;
selecting between said plural sources for said another sports game of said first type, based on the stored rule data; and
arranging for the viewer to view said another sports game of said first type, from said selected source.

8. The method of claim 1 in which the program content of the first type comprises a sports game of a first type, involving two competing teams, and the method includes:
using said metadata to identify plural sources for another sports game of said first type involving one of said teams;
selecting between said plural sources for said another sports game of said first type involving one of said teams, based on the stored rule data; and
arranging for the viewer to view said another sports game of said first type involving one of said teams, from said selected source.

9. The method of claim 1 in which the program content of the first type comprises a sporting event involving a competitor, and the method includes:
using said metadata to identify plural sources for another sporting event involving said competitor;
selecting between said plural sources for said another sporting event involving said competitor, based on the stored rule data; and arranging for the viewer to view said another sporting event involving said competitor, from said selected source.

10. The method of claim 2 in which the stored rule data expresses a preference of the user regarding at least two of (a)-(f).

11. The method of claim 2 in which the stored rule data expresses a preference of the user regarding at least three of (a)-(f).

12. The method of claim 2 in which the stored rule data indicates one of (a)-(f) that should be given priority over another of (a)-(f) in selecting the source.

13. A method in which a user device samples audio from audio-visual program content being delivered from a first networked source to a first rendering device, and rendered by said first device to a user, the method comprising the acts:
transforming the sampled audio data by a watermark extraction process to yield watermark payload data, using a hardware processor configured to perform such transforming, said watermark extraction process including the acts:
discerning a watermark calibration signal in the sampled audio data;
adjusting the sampled audio data in accordance with the discerned watermark calibration signal;
extracting a series of raw bits by demodulating the adjusted sample data with a carrier signal, said raw bits redundantly encoding a watermark payload; and
decoding the watermark payload data from the extracted series of raw bits;
submitting said watermark payload data to a database and, in response, obtaining metadata about said audio-visual program content, based on the sample audio; and
using the metadata in arranging delivery of said audio-visual content to the user from a second networked source different than the first networked source, said second networked source being selected from among plural networked sources, based on user preference data, the user preference data concerning a preference of the user regarding at least one of: (a) streaming media content vs. downloaded; (b) free content vs. paid; (c) commercials; (d) video resolution; (e) delivery from sources that may be unauthorized; and (f) source.

14. The method of claim 13 in which the user preference data concerns a preference of the user regarding at least two of (a)-(f).

15. The method of claim 13 in which the user preference data concerns a preference of the user regarding at least three of (a)-(f).

16. The method of claim 13 in which the user preference data indicates one of (a)-(f) that should be given priority over another of (a)-(f) in selecting from among the plural networked sources.

17. The method of claim 13 in which said act of arranging delivery comprises arranging delivery of said audio-visual program content to said user device.

18. A method comprising the acts:
transforming audio data sampled from first audio-visual program content that is rendered by a first device to a user and that comprises a sporting event of a first type involving first and second competitors, by a watermark extraction process to yield watermark payload data, using a hardware processor configured to perform such transforming, said watermark extraction process including the acts:
discerning a watermark calibration signal in the audio data;
adjusting the audio data in accordance with the discerned watermark calibration signal;
extracting a series of raw bits by demodulating the adjusted audio data with a carrier signal, said raw bits redundantly encoding a watermark payload; and
decoding the watermark payload data from the extracted series of raw bits;
submitting said watermark payload data to a database and, in response, obtaining metadata about said audio-visual program content; and
based on said metadata, identifying related second audio-visual program content, said second content comprising:
another sporting event of said first type involving one of said competitors;
a sporting event involving said first and second competitors, but being of an event type different than said first type;
wherein said identifying is performed by a hardware processor configured to perform such act.

19. The method of claim 18 that further includes:
identifying plural alternative sources for the related second audio-visual program content;
selecting between said identified plural alternative sources based on stored rule data, said selecting being performed by a hardware processor configured to perform such act; and
arranging for the user to view the related second audio-visual program content, from said selected source.

\* \* \* \* \*